US012028819B2

(12) United States Patent
Ko et al.

(10) Patent No.: US 12,028,819 B2
(45) Date of Patent: Jul. 2, 2024

(54) GENERATION OF SYNCHRONIZATION SIGNAL FOR SIDELINK COMMUNICATION

(71) Applicant: LG ELECTRONICS INC., Seoul (KR)

(72) Inventors: Woosuk Ko, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 318 days.

(21) Appl. No.: 17/608,431

(22) PCT Filed: May 4, 2020

(86) PCT No.: PCT/KR2020/005843
§ 371 (c)(1),
(2) Date: Nov. 2, 2021

(87) PCT Pub. No.: WO2020/222596
PCT Pub. Date: Nov. 5, 2020

(65) Prior Publication Data
US 2022/0225250 A1    Jul. 14, 2022

(30) Foreign Application Priority Data

May 2, 2019  (KR) .................. 10-2019-0051709
Oct. 4, 2019  (KR) .................. 10-2019-0123224
Nov. 7, 2019  (KR) .................. 10-2019-0141733

(51) Int. Cl.
*H04W 56/00*    (2009.01)
(52) U.S. Cl.
CPC ................. *H04W 56/001* (2013.01)

(58) Field of Classification Search
None
See application file for complete search history.

(56) References Cited

U.S. PATENT DOCUMENTS

2020/0015214 A1*  1/2020  Si ..................... H04L 25/03866
2022/0140967 A1*  5/2022  Khoryaev ........... H04W 56/002
                                                            375/220

FOREIGN PATENT DOCUMENTS

CN        109076478        12/2018

OTHER PUBLICATIONS

Intel Corporation, Sidelink Synchronization Design for NR V2X Communication, R1-1904297, 3GPP TSG RAN WG1 Meeting #96bis, Xi'an, China, Apr. 3, 2019, see sections 1, 2.2.2, 3, 7; and figure 2.
CATT, Feature lead summary on AI 7.2.4.3 Sidelink synchronization mechanism, R1-1905623, 3GPP TSG RAN WG1 Meeting #96bis, Xi'an, China, Apr. 9, 2019, see sections 1, 4.
(Continued)

*Primary Examiner* — Diane L Lo
(74) *Attorney, Agent, or Firm* — BRYAN CAVE LEIGHTON PAISNER LLP

(57) ABSTRACT

According to an embodiment of the present disclosure, provided is a method by which a first device performs SL communication. The method may comprise the steps of: generating S-SSB including symbols for S-PSS, symbols for S-SSS, and symbols for PSBCH; and transmitting the S-SSB to a second device, wherein a total number of symbols for S-PSS is three, and the symbols for S-PSS include a first S-PSS symbol, a second S-PSS symbol, and a third S-PSS symbol.

12 Claims, 30 Drawing Sheets

(56) References Cited

OTHER PUBLICATIONS

Huawei, et al., Sidelink synchronization mechanisms for NR V2X, R1-1900025, 3GPP TSG RAN WG1 Ad-Hoc Meeting 1901, Taipei, Jan. 11, 2019, see section 2.
Convida Wireless, Design Considerations for NR V2X Synchronization, R1-1903155, 3GPP TSG-RAN WG1 Meeting #96, Athens, Greece, Feb. 16, 2019, see section 2.

* cited by examiner

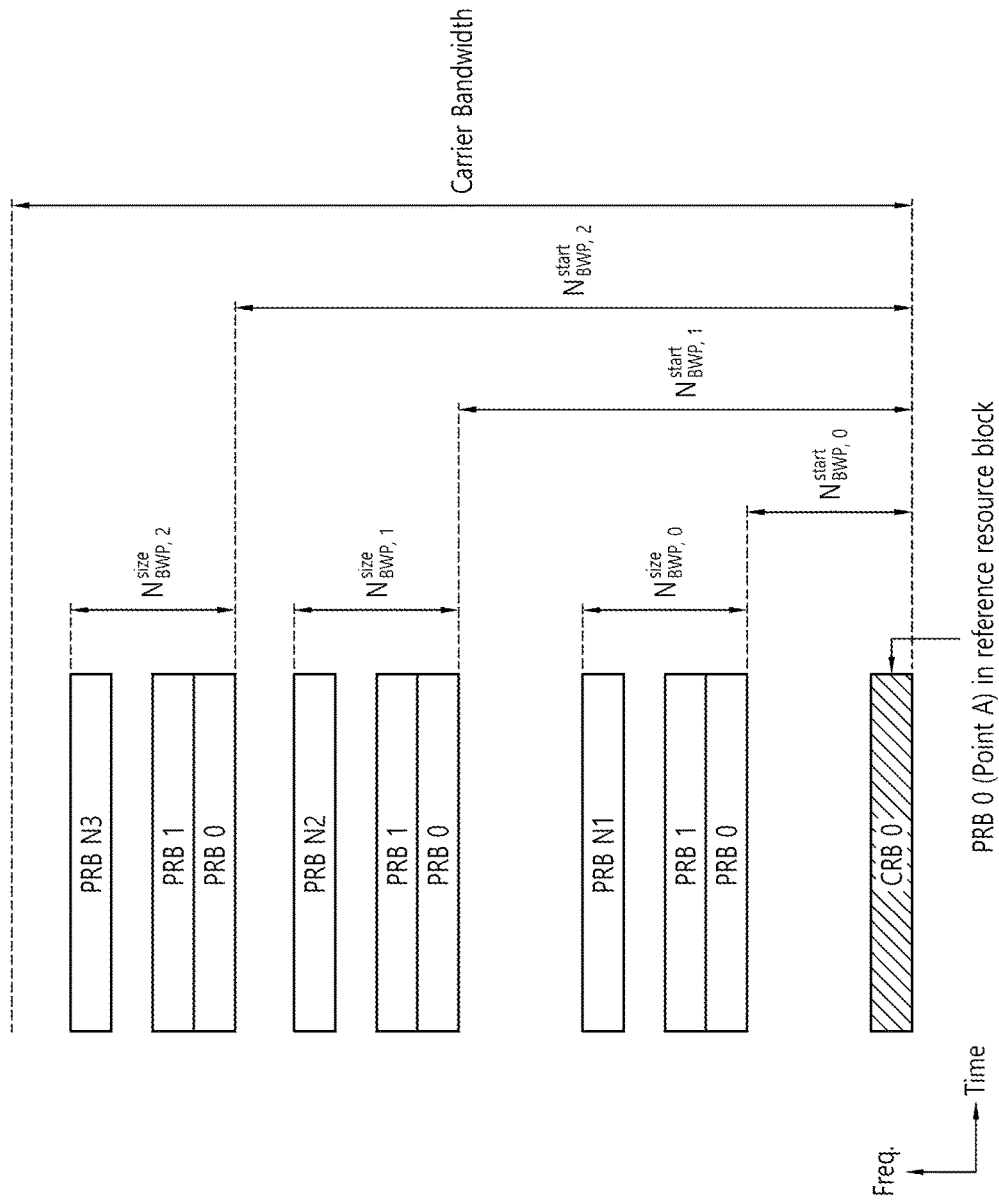

FIG. 19 receive a S-SSB including symbols related
to a S-PSS, symbols related to a S-SSS and         — S1910
symbols related to a PSBCH from a first apparatus

GENERATION OF SYNCHRONIZATION SIGNAL FOR SIDELINK COMMUNICATION

This application is the National Stage filing under 35 U.S.C. 371 of International Application No. PCT/KR2020/005843 filed on May 4, 2020, which claims priority to Korean Patent Application Nos. 10-2019-0051709 filed on May 2, 2019; 10-2019-0123224 filed on Oct. 4, 2019 and 10-2019-0141733 filed on Nov. 7, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

The present disclosure provides a method for communication between devices (or UEs) based on V2X communication, and device(s) (or UE(s)) performing the method.

Another technical object of the present disclosure is to provide a method for generating a synchronization signal for sidelink communication and an apparatus (or terminal) for performing the same.

Technical Solutions

According to an embodiment of the present disclosure, a method for a first device to perform sidelink (SL) communication may be provided. The method may comprise: generating a sidelink synchronization signal block (S-SSB)

including symbols related to a sidelink primary synchronization signal (S-PSS), symbols related to sidelink secondary synchronization signal (S-SSS) and symbols related to a physical sidelink broadcast channel (PSBCH); and transmitting the S-SSB to a second apparatus, wherein the total number of the S-PSS symbols is 3, and wherein the S-PSS symbols include a first S-PSS symbol, a second S-PSS symbol and a third S-PSS symbol.

According to an embodiment of the present disclosure, a first apparatus for performing sidelink (SL) communication may be proposed. The first apparatus may comprise: one or more memories storing instructions; one or more transceivers; and one or more processors connected to the one or more memories and the one or more transceivers, wherein the one or more transceivers: generate a sidelink synchronization signal block (S-SSB) including symbols related to a sidelink primary synchronization signal (S-PSS), symbols related to sidelink secondary synchronization signal (S-SSS) and symbols related to a physical sidelink broadcast channel (PSBCH), control the one or more transceivers to transmit the S-SSB to a second apparatus, wherein the total number of the S-PSS symbols is 3, and wherein the S-PSS symbols include a first S-PSS symbol, a second S-PSS symbol and a third S-PSS symbol.

According to an embodiment of the present disclosure, an apparatus configured to control a first user equipment (UE) may be proposed. The apparatus may comprise: one or more processors; and one or more memories operably connectable to the one or more processors and storing instructions, wherein the one or more processors execute the instructions to: generate a sidelink synchronization signal block (S-SSB) including symbols related to a sidelink primary synchronization signal (S-PSS), symbols related to sidelink secondary synchronization signal (S-SSS) and symbols related to a physical sidelink broadcast channel (PSBCH); and transmit the S-SSB to a second apparatus, wherein the total number of the S-PSS symbols is 3, and wherein the S-PSS symbols include a first S-PSS symbol, a second S-PSS symbol and a third S-PSS symbol.

According to an embodiment of the present disclosure, a non-transitory computer-readable storage medium storing instructions may be proposed. The instructions, when executed, cause a first apparatus to: generate a sidelink synchronization signal block (S-SSB) including symbols related to a sidelink primary synchronization signal (S-PSS), symbols related to sidelink secondary synchronization signal (S-SSS) and symbols related to a physical sidelink broadcast channel (PSBCH); and transmit the S-SSB to a second apparatus, wherein the total number of the S-PSS symbols is 3, and wherein the S-PSS symbols include a first S-PSS symbol, a second S-PSS symbol and a third S-PSS symbol.

According to an embodiment of the present disclosure, a method for performing, by a second apparatus, sidelink (SL) communication may be proposed. The method may comprise: receiving, from a first apparatus, a sidelink synchronization signal block (S-SSB) including symbols related to a sidelink primary synchronization signal (S-PSS), symbols related to sidelink secondary synchronization signal (S-SSS) and symbols related to a physical sidelink broadcast channel (PSBCH), wherein the total number of the S-PSS symbols is 3, and wherein the S-PSS symbols include a first S-PSS symbol, a second S-PSS symbol and a third S-PSS symbol.

According to an embodiment of the present disclosure, a second apparatus for performing sidelink (SL) communication may be proposed. The second apparatus may comprise: one or more memories storing instructions; one or more transceivers; and one or more processors connected to the one or more memories and the one or more transceivers, wherein the one or more transceivers: control the one or more transceivers to receive, from a first apparatus, a sidelink synchronization signal block (S-SSB) including symbols related to a sidelink primary synchronization signal (S-PSS), symbols related to sidelink secondary synchronization signal (S-SSS) and symbols related to a physical sidelink broadcast channel (PSBCH), wherein the total number of the S-PSS symbols is 3, and wherein the S-PSS symbols include a first S-PSS symbol, a second S-PSS symbol and a third S-PSS symbol.

Effects of the Disclosure

According to the present disclosure, sidelink communication between devices (or terminals) can be efficiently performed.

According to the present disclosure, the UE can efficiently transmit a sidelink-synchronization signal block (S-SSB).

According to the present disclosure, reception performance of at least one symbol related to a sidelink-primary synchronization signal (S-PSS) in sidelink communication may be compensated.

BRIEF DESCRIPTION OF THE DRAWINGS

FIG. 7 shows an example of a BWP, based on an embodiment of the present disclosure.

FIG. 19 shows operations of a second device, based on an embodiment of the present disclosure.

DESCRIPTION OF EXEMPLARY EMBODIMENTS

Figure 1:
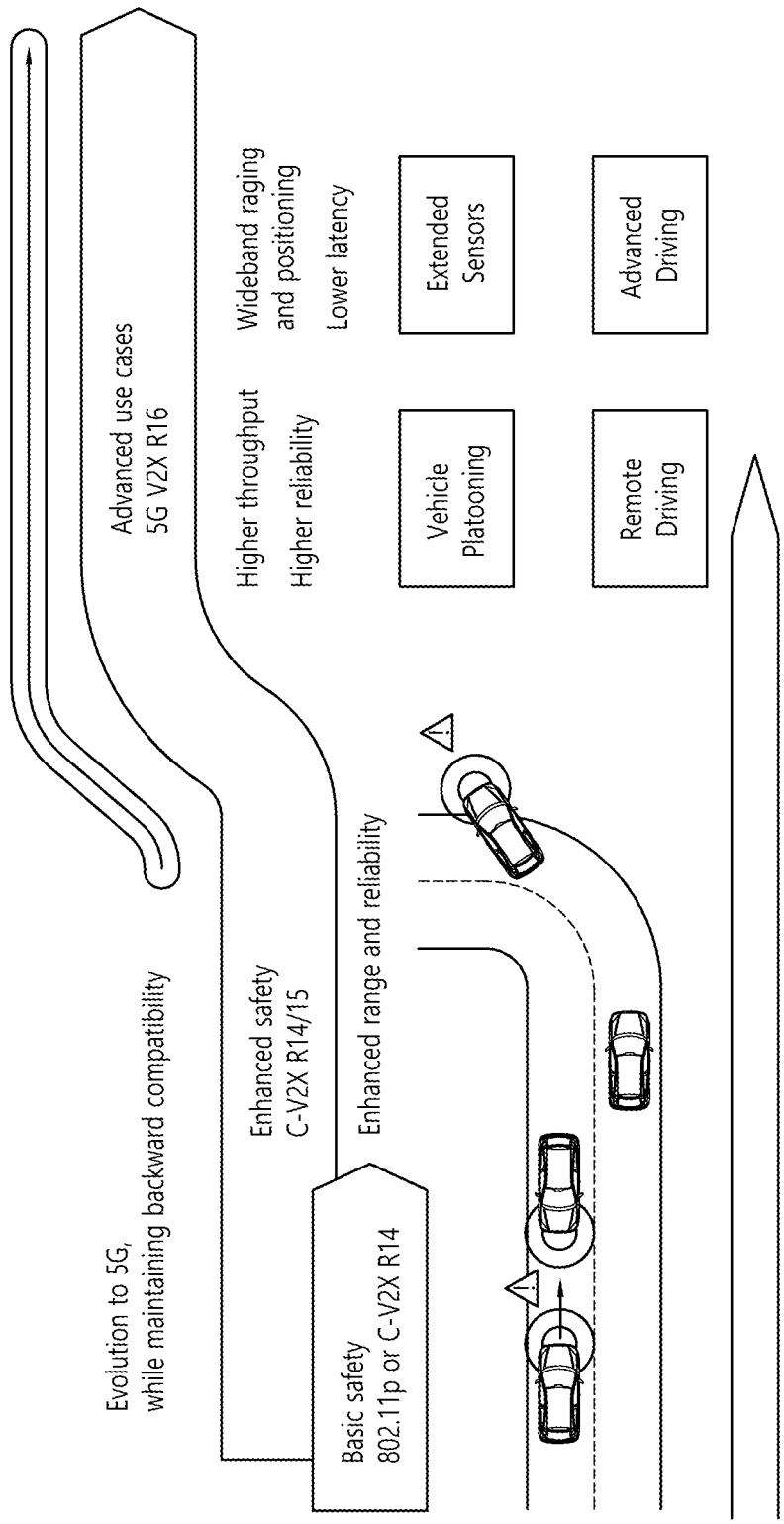
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet radio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
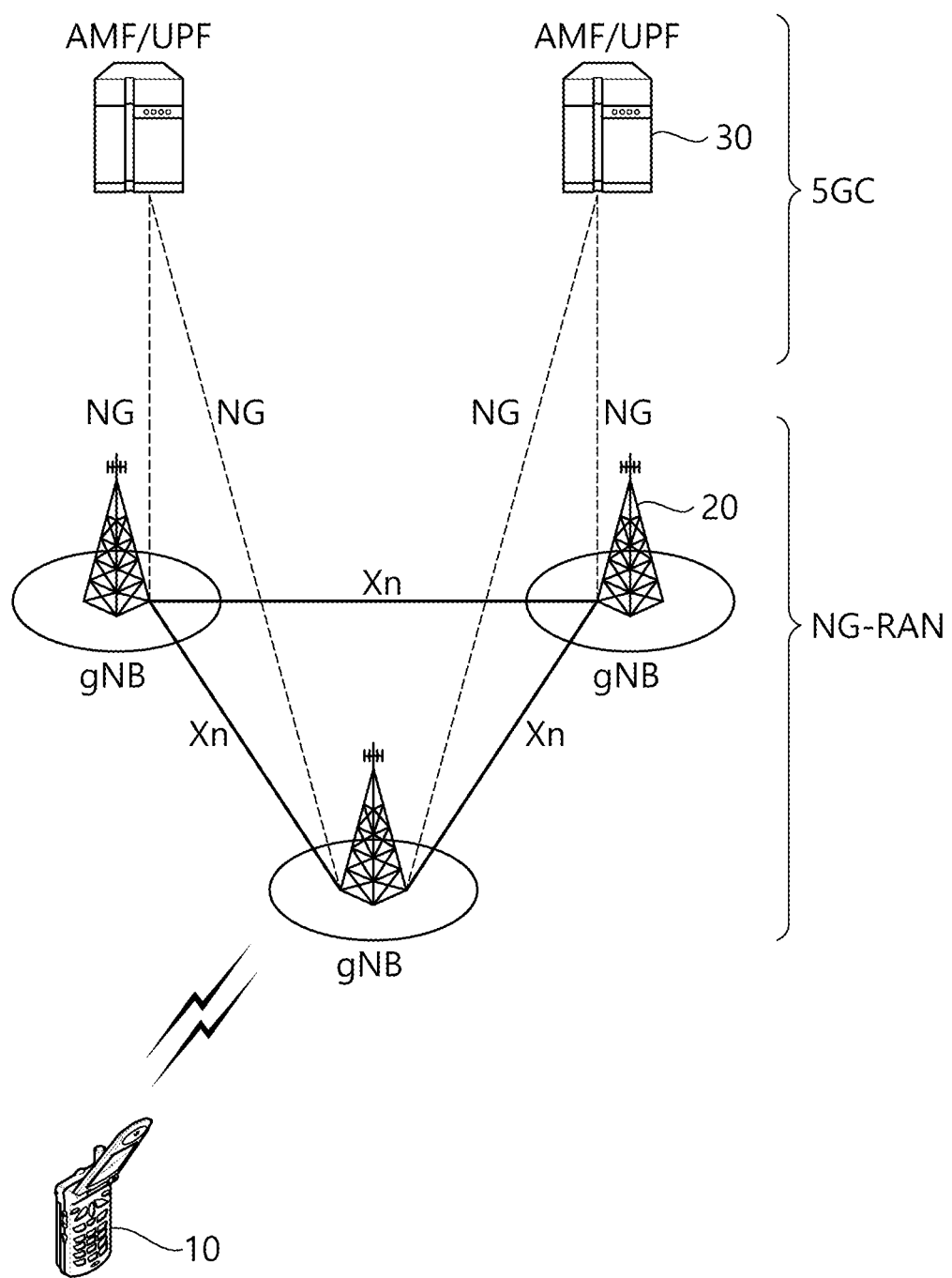
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
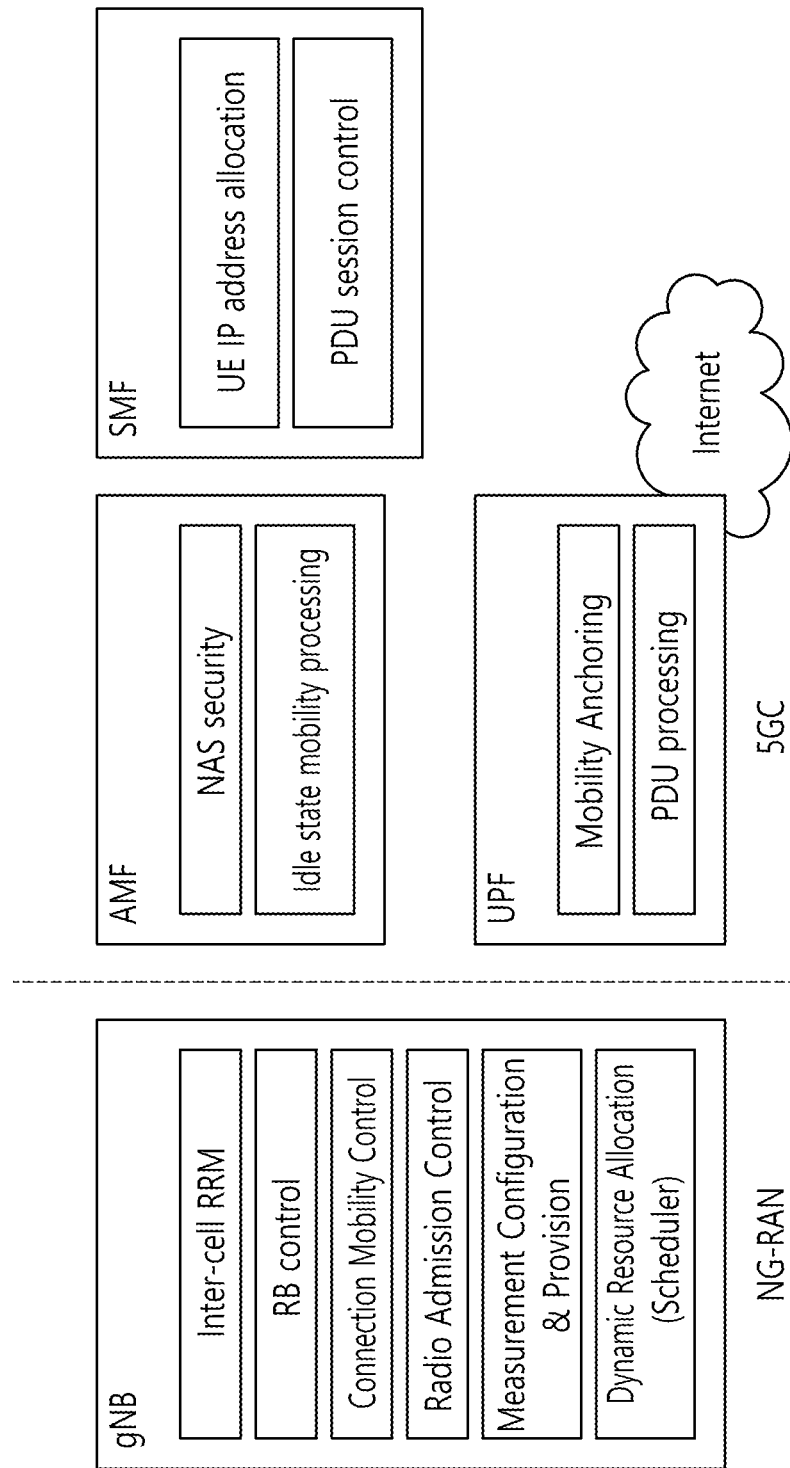
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
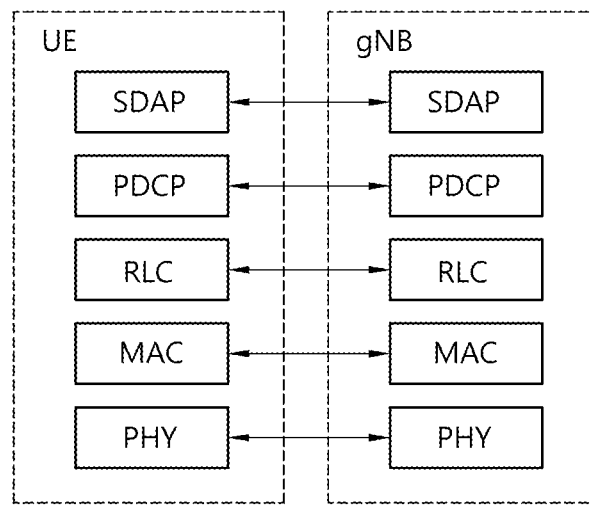
FIGS. 4A and 4B show a radio protocol architecture, based on an embodiment of the present disclosure.
Figure 4B:
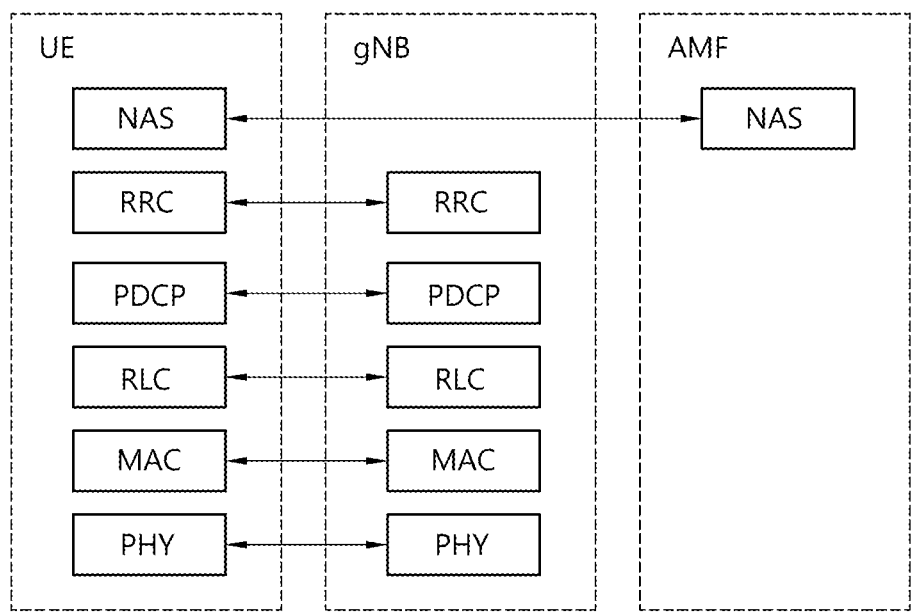

FIGS. 4A and 4B show a radio protocol architecture, based on an embodiment of the present disclosure. The embodiment of FIGS. 4A and 4B may be combined with various embodiments of the present disclosure. Specifically, FIG. 4A shows a radio protocol architecture for a user plane, and FIG. 4B shows a radio protocol architecture for a control plane. The user plane corresponds to a protocol stack for user data transmission, and the control plane corresponds to a protocol stack for control signal transmission.

Referring to FIGS. 4A and 4B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
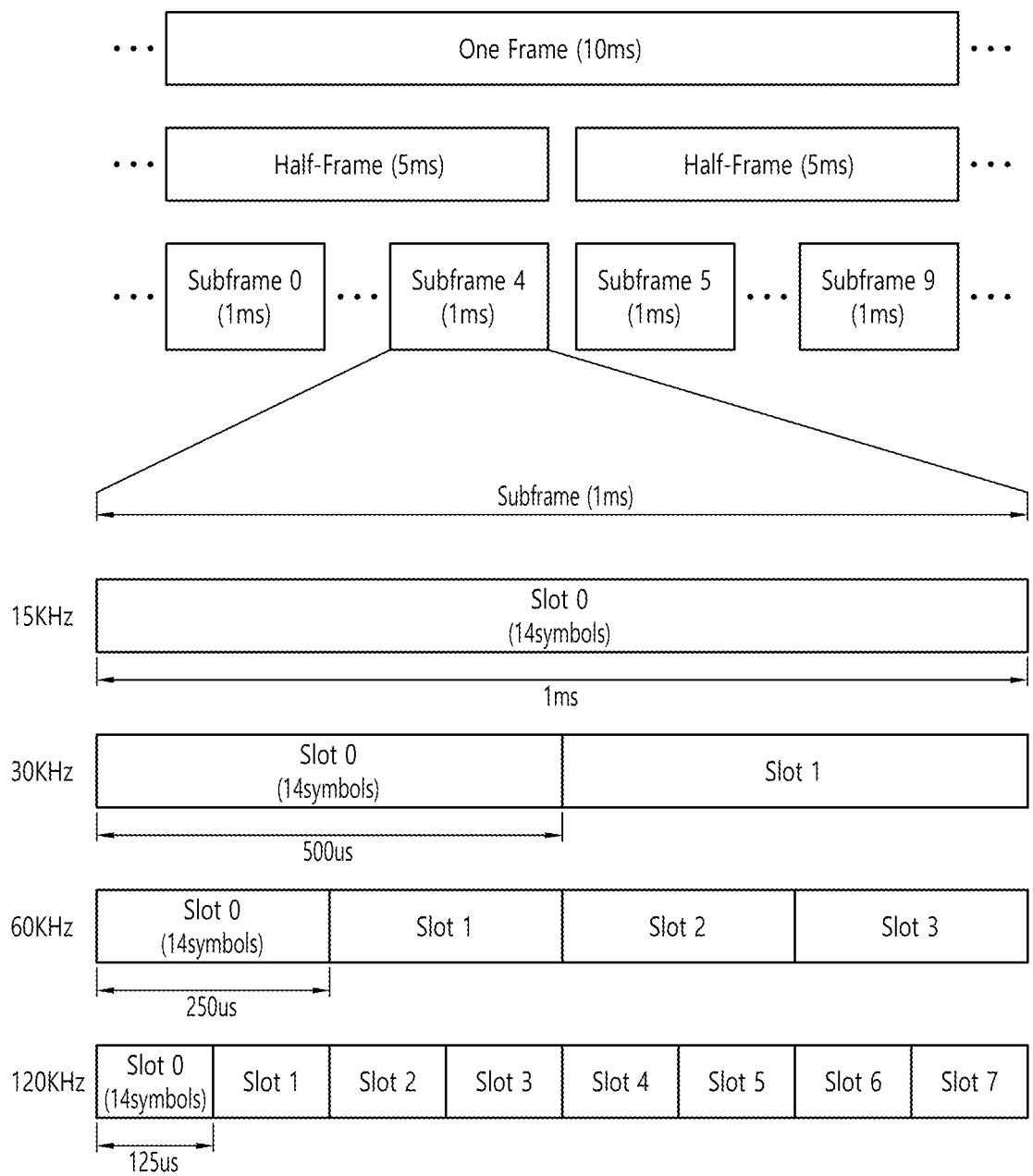
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
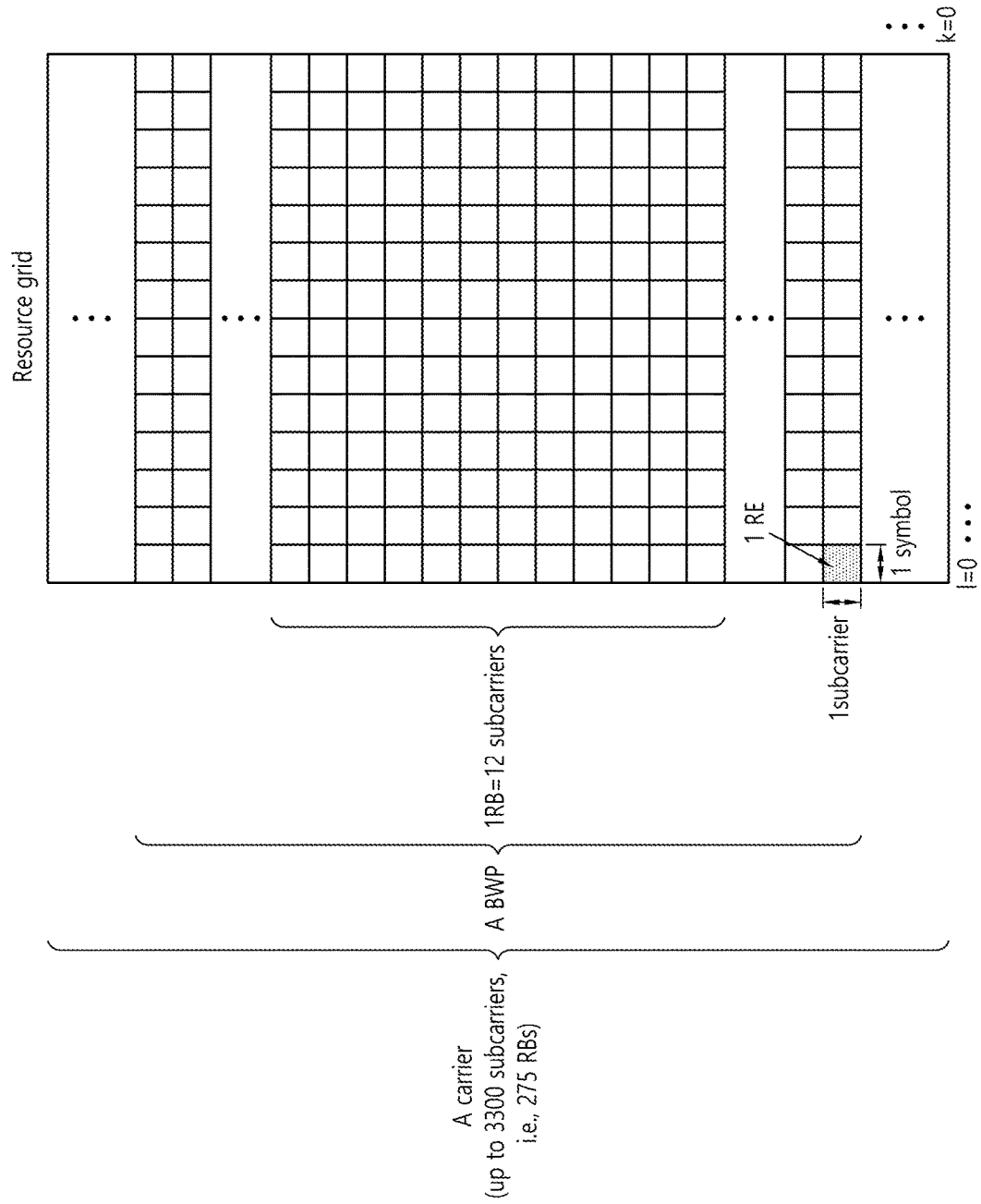
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
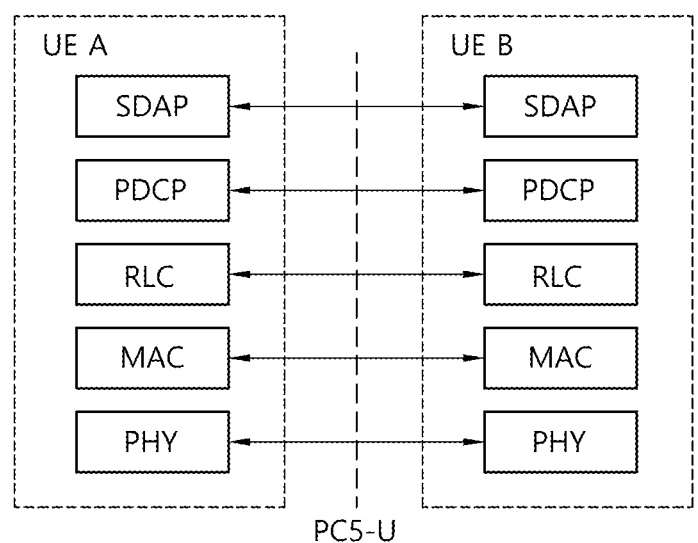
FIGS. 8A and 8B show a radio protocol architecture for a SL communication, based on an embodiment of the present disclosure.
Figure 8B:
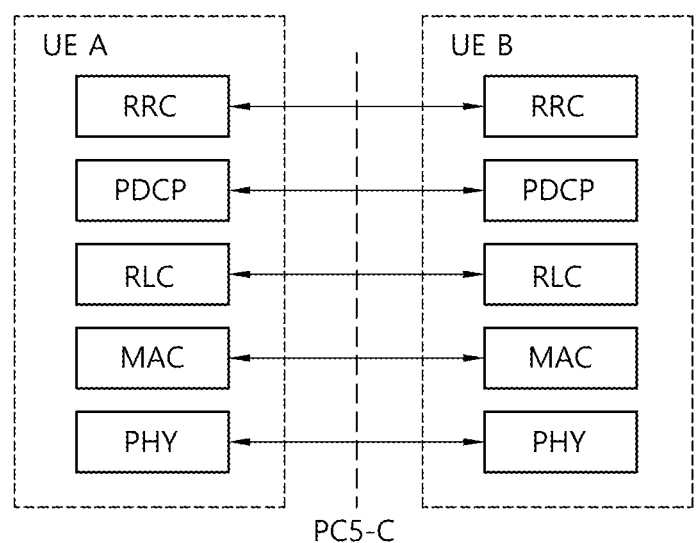

FIGS. 8A and 8B show a radio protocol architecture for a SL communication, based on an embodiment of the present disclosure. The embodiment of FIGS. 8A and 8B may be combined with various embodiments of the present disclosure. More specifically, FIG. 8A shows a user plane protocol stack, and FIG. 8B shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
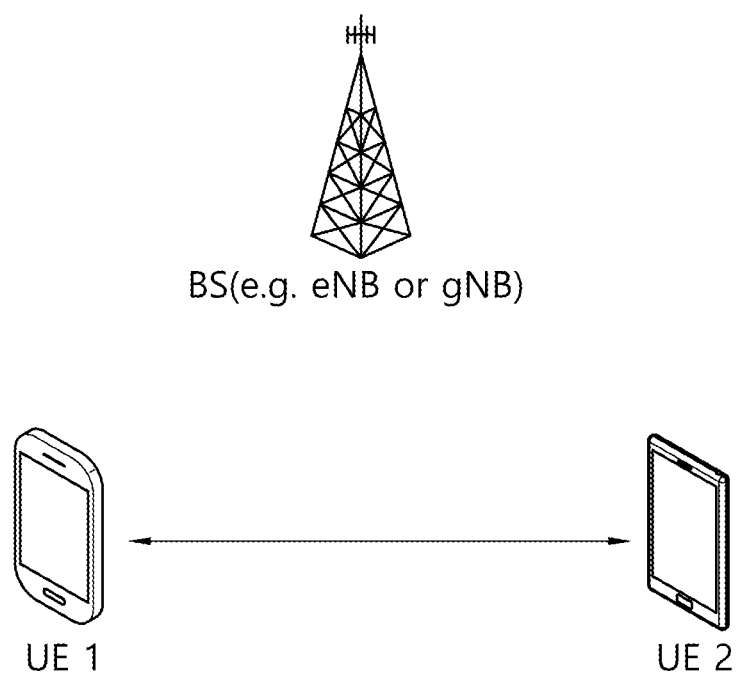
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10A:
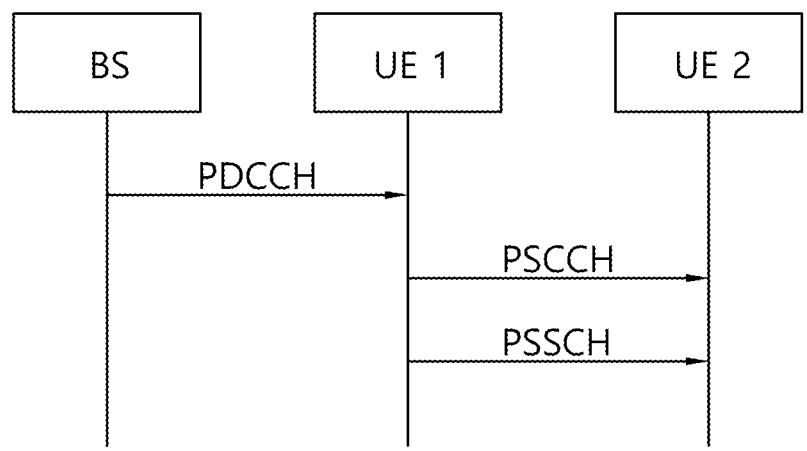
FIGS. 10A and 10B show a procedure of performing V2X or SL communication by a UE based on a transmission mode, based on an embodiment of the present disclosure.
Figure 10B:
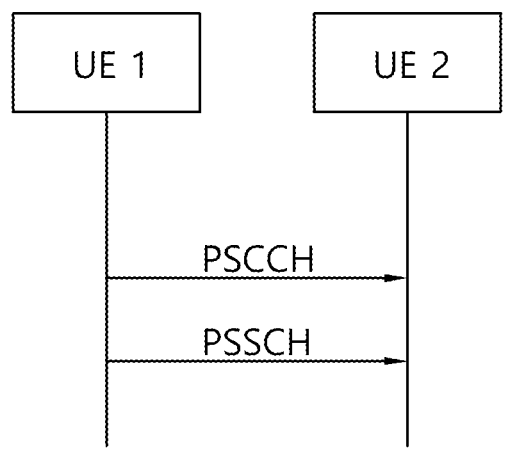

FIGS. 10A and 10B show a procedure of performing V2X or SL communication by a UE based on a transmission mode, based on an embodiment of the present disclosure. The embodiment of FIGS. 10A and 10B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10A shows a UE operation related to an LTE transmission mode 1 or an LTE transmission mode 3. Alternatively, for example, FIG. 10A shows a UE operation related to an NR resource allocation mode 1. For example, the LTE transmission mode 1 may be applied to general SL communication, and the LTE transmission mode 3 may be applied to V2X communication.

For example, FIG. 10B shows a UE operation related to an LTE transmission mode 2 or an LTE transmission mode 4. Alternatively, for example, FIG. 10B shows a UE operation related to an NR resource allocation mode 2.

Referring to FIG. 10A, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11A:
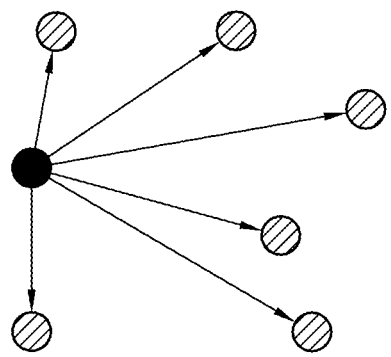
FIGS. 11A to 11C show three cast types, based on an embodiment of the present disclosure.
Figure 11B:
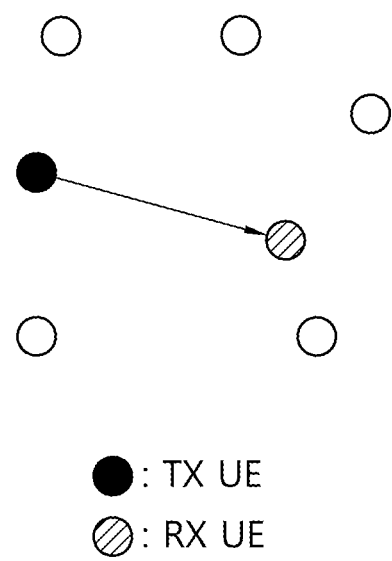
Figure 11C:
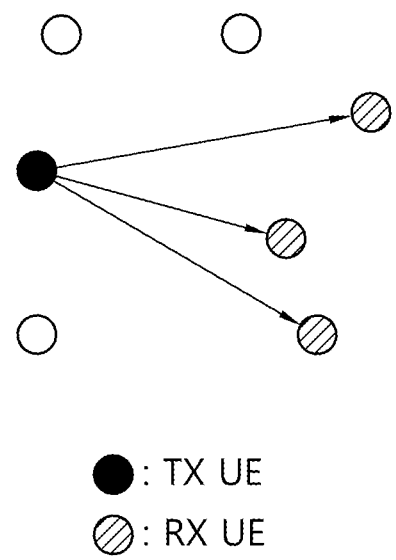

FIGS. 11A to 11C show three cast types, based on an embodiment of the present disclosure. The embodiment of FIGS. 11A to 11C may be combined with various embodiments of the present disclosure. Specifically, FIG. 11A shows broadcast-type SL communication, FIG. 11B shows unicast type-SL communication, and FIG. 11C shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in SL communication, a UE needs to efficiently select resource(s) for SL transmission. Hereinafter, based on various embodiments of the present disclosure, a method for a UE to efficiently select resource(s) for SL transmission and an apparatus supporting the same will be described. In various embodiments of the present disclosure, SL communication may include V2X communication.

At least one of the methods that are proposed based on the various embodiments of the present disclosure may be applied to at least one of unicast communication, groupcast communication, and/or broadcast communication.

At least one of the methods that are proposed based on the various embodiments of the present disclosure may be applied not only to PC5 interface or SL interface (e.g., PSCCH, PSSCH, PSBCH, PSSS/SSSS, and so on) based SL communication or V2X communication but also to Uu interface (e.g., PUSCH, PDSCH, PDCCH, PUCCH, and so on) based SL communication or V2X communication.

In the various embodiments of the present disclosure, receiving operation(s) (or action(s)) of the UE may include decoding operation(s) and/or receiving operation(s) of SL channel(s) and/or SL signal(s) (e.g., PSCCH, PSSCH, PSFCH, PSBCH, PSSS/SSSS, and so on). Receiving operation(s) of the UE may include decoding operation(s) and/or receiving operation(s) of WAN DL channel(s) and/or WAN DL signal(s) (e.g., PDCCH, PDSCH, PSS/SSS, and so on). Receiving operation(s) of the UE may include sensing operation(s) and/or channel busy ratio (CBR) measuring operation(s). In the various embodiments of the present disclosure, Sensing operation(s) of the UE may include PSSCH-RSRP measuring operation(s) based on PSSCH DM-RS sequence(s), PSSCH-RSRP measuring operation(s) based on PSSCH DM-RS sequence(s), which is scheduled by a PSCCH that is successfully decoded by the UE, sidelink RSSI (S-RSSI) measuring operation(s), and/or S-RSSI measuring operation(s) based on subchannel(s) related to V2X resource pool(s). In the various embodiments of the present disclosure, transmitting operation(s) of the UE may include transmitting operation(s) of SL channel(s) and/or SL signal(s) (e.g., PSCCH, PSSCH, PSFCH, PSBCH, PSSS/SSSS, and so on). Transmitting operation(s) may include transmitting operation(s) of WAN UL channel(s) and/or WAN UL signal(s) (e.g., PUSCH, PUCCH, SRS, and so on). In the various embodiments of the present disclosure, a synchronization signal may include an SLSS and/or a PSBCH.

In the various embodiments of the present disclosure, configuration may include signaling, signaling from a network, configuration from a network, and/or a pre-configuration from a network. In the various embodiments of the present disclosure, definition may include signaling, signaling from a network, configuration from a network, and/or a pre-configuration from a network. In the various embodiments of the present disclosure, designation may include signaling, signaling from a network, configuration from a network, and/or a pre-configuration from a network.

In the various embodiments of the present disclosure, ProSe Per Packet Priority (PPPP) may be replaced with ProSe Per Packet Reliability (PPPR), and PPPR may be replaced with PPPP. For example, as the PPPP value becomes smaller, this may indicate a high priority, and, as the PPPP value becomes greater, this may indicate a low priority. For example, as the PPPR value becomes smaller, this may indicate a high reliability, and, as the PPPR value becomes greater, this may indicate a low reliability. For example, a PPPP value related to a service, a packet or a message being related to a high priority may be smaller than a PPPP value related to a service, a packet or a message being related to a low priority. For example, a PPPR value related to a service, a packet or a message being related to a high reliability may be smaller than a PPPR value related to a service, a packet or a message being related to a low reliability.

In the various embodiments of the present disclosure, a session may include at least one of a unicast session (e.g., a unicast session for SL), a groupcast/multicast session (e.g., a groupcast/multicast session for SL), and/or a broadcast session (e.g., a broadcast session for SL).

In the various embodiments of the present disclosure, a carrier may be replaced with at least one of a BWP and/or a resource pool, or vice versa. For example, a carrier may include at least one of a BWP and/or a resource pool. For example, a carrier may include one or more BWPs. For example, a BWP may include one or more resource pools.

Hereinafter, a sidelink synchronization signal (SLSS) and synchronization information will be described.

The SLSS may be an SL-specific sequence and include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and/or for synchronization acquisition. For example, the UE may use the S-PSS and the S-SSS for acquisition of fine synchronization and/or for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Meanwhile, a plurality of numerologies having different SCSs and/or CP lengths may be supported in an NR SL system. In this case, a length of a time resource used by a transmitting UE to transmit the S-SSB may be decreased along with an increase in the SCS. Accordingly, coverage of the S-SSB may be decreased. Therefore, in order to ensure the coverage of the S-SSB, the transmitting UE may transmit one or more S-SSBs to a receiving UE within one S-SSB transmission period based on the SCS. For example, the number of S-SSBs transmitted by the transmitting UE to the receiving UE within one S-SSB transmission period may be pre-configured or configured to the transmitting UE. For example, an S-SSB transmission period may be 160 ms. For example, the S-SSB transmission period of 160 ms may be supported for all SCSs.

For example, if the SCS is 15 kHz in FR1, the transmitting UE may transmit 1 or 2 S-SSBs to the receiving UE within one S-SSB transmission period. For example, if the SCS is 30 kHz in FR1, the transmitting UE may transmit 1 or 2 S-SSBs to the receiving UE within one S-SSB transmission period. For example, if the SCS is 60 kHz in FR1, the transmitting UE may transmit 1, 2, or 4 S-SSBs to the receiving UE within one S-SSB transmission period.

For example, if the SCS is 60 kHz in FR2, the transmitting UE may transmit 1, 2, 4, 8, 16, or 32 S-SSBs to the receiving UE within one S-SSB transmission period. For example, if the SCS is 120 kHz in FR2, the transmitting UE may transmit 1, 2, 4, 8, 16, 32, or 64 S-SSBs to the receiving UE within one S-SSB transmission period.

Meanwhile, if the SCS is 60 kHz, two types of CP may be supported. In addition, a structure of an S-SSB transmitted by the transmitting UE to the receiving UE may differ depending on a CP type. For example, the CP type may be normal CP (NCP) or extended CP (ECP). Specifically, for example, if the CP type is the NCP, the number of symbols for mapping a PSBCH within an S-SSB transmitted by the transmitting UE may be 9 or 8. Otherwise, for example, if the CP type is the ECP, the number of symbols for mapping the PSBCH within the S-SSB transmitted by the transmitting UE may be 7 or 6. For example, the PSBCH may be mapped to a first/initial symbol within the S-SSB transmitted by the transmitting UE. For example, the receiving UE which receives the S-SSB may perform an automatic gain control (AGC) operation in a first/initial symbol duration of the S-SSB.

Figure 12:
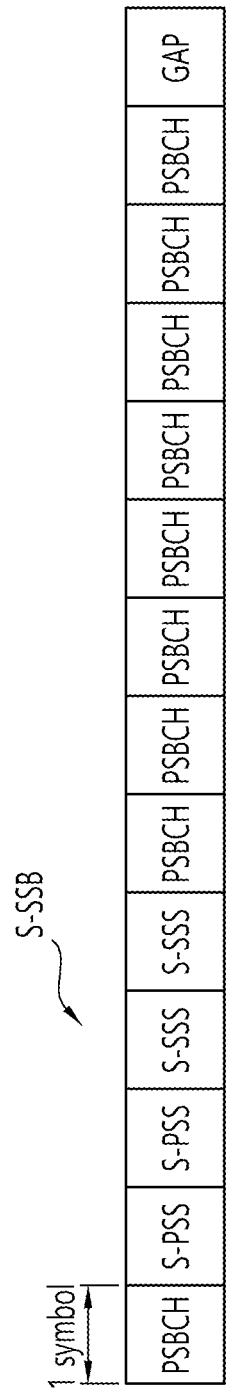
FIG. 12 shows a structure of an S-SSB when a CP type is NCP, based on an embodiment of the present disclosure.

FIG. 12 shows a structure of an S-SSB when a CP type is NCP, based on an embodiment of the present disclosure.

For example, if the CP type is the NCP, the structure of the S-SSB, i.e., an order of symbols to which an S-PSS, an S-SSS, and a PSBCH are mapped within the S-SSB transmitted by a transmitting UE may refer to FIG. 12.

Figure 13:
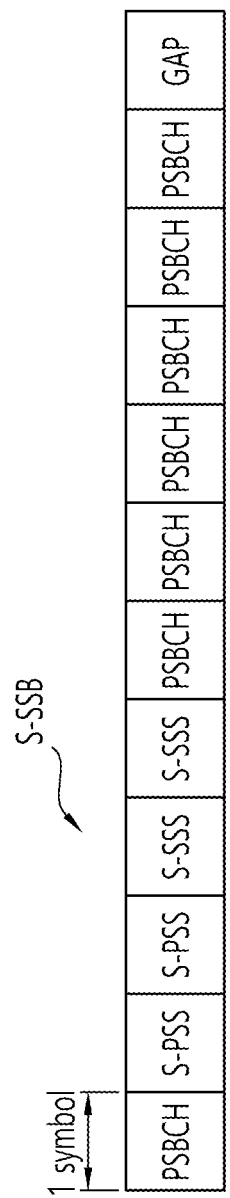
FIG. 13 shows a structure of an S-SSB when a CP type is ECP, based on an embodiment of the present disclosure.

FIG. 13 shows a structure of an S-SSB when a CP type is ECP, based on an embodiment of the present disclosure.

For example, if the CP type is the ECP, unlike in FIG. 12, the number of symbols for mapping a PSBCH after an S-SSS within an S-SSB may be 6. Accordingly, coverage of the S-SSB may differ depending on whether the CP type is the NCP or the ECP.

Meanwhile, as described above, the synchronization signal block (SSB) used for initial access in the V2X communication system may include the sidelink primary synchronization signal (S-PSS), the sidelink secondary synchronization signal (S-SSS) and the physical sidelink broadcast channel (PSBCH). The S-PSS may be used for detecting initial signal(s) and obtaining synchronization, and the S-SSS may be used together with the S-PSS for obtaining detailed synchronization and detecting synchronization signal ID, and the PSBCH may be used for signaling of system information. That is, each signal is important to obtain synchronization and basic system information, and it is necessary for UE(s) to initially receive and decode the S-SSB for normal data communication.

Due to the importance of S-SSB reception, the S-SSB may be designed to maximize reception and decoding performance. To this end, among signals included in the S-SSB, for example, the S-PSS and the S-SSS used as synchronization signals may be designed to satisfy at least one of 1) to 4) below.

1) Cross-correlation between sequence(s) used in S-PSS
2) Cross-correlation between sequence(s) used in S-SSS
3) Correlation between S-PSS and S-SSS
4) Robustness of S-PSS detection and S-SSS detection for a frequency offset For example, S-PSS sequence(s) may use a plurality of sequences for transmitting information indicating whether or not a UE is included in a signal reception coverage of a base station by using a part of synchronization signal ID(s), etc., and thus S-PSS sequence(s) may have high auto-correlation characteristics and low cross-correlation characteristics. S-SSS sequence(s) may use a plurality of sequences for transmitting synchronization signal ID information, etc., and may have high auto-correlation characteristics and low cross-correlation characteristics like S-PSS sequence(s).

Since a frequency offset is not corrected when a UE initially detects a signal and performs synchronization, the S-PSS used for initial synchronization should have robust detection performance for the frequency offset. In one embodiment, if the PSS signal uses N1 sequences and each sequence is generated from an m-sequence having a length L value using the same polynomial, each sequence may be generated using a cyclic shift that is an integer multiple of L/N1, in order to design so that there is no performance degradation due to the frequency offset as much as possible.

For example, in order to generate S-SSS sequence(s) having a sequence length greater than L while having a low correlation with the S-PSS, a gold sequence may be generated by XOR for two different m-sequences. In this case, in order to have a low correlation between the S-SSS and the S-PSS, a polynomial of one of two sequences used for generating the S-SSS may be determined as a polynomial of sequence(s) used for generating the S-PSS. The other sequence used to generate the S-SSS may be different from sequence(s) derived based on the determined sequence polynomial.

For example, in an environment in which the S-PSS and the S-SSS are used for a Uu link between a base station and a UE, the S-PSS and the S-SSS used for a SL communication between UEs may have a problem in that synchronization performance is deteriorated due to a high cross-correlation with the Uu link, or greatly affected by a frequency offset because a cross-correlation with the Uu link is low.

In some embodiments, when the Uu link between the base station and the UE and the SL communication between UEs operate in a time-division duplex (TDD) scheme, SL synchronization signal(s) that have low cross-correlation with synchronization signal(s) used for the Uu link and have robustness for a frequency offset during initial access is proposed. For example, the S-PSS and the S-SSS need to satisfy at least one of conditions 1) to 5) below.

1) High auto-correlation and low cross-correlation of S-PSS
2) High auto-correlation and low cross-correlation of S-SSS
3) Low cross-correlation between S-PSS and S-SSS
4) Robustness of S-PSS detection and S-SSS detection for a frequency offset
5) Low cross-correlation between S-PSS/S-SSS and Uu-PSS/Uu-SSS For example, in order to satisfy the conditions 1) to 5), the S-PSS may use sequence(s) having the largest cyclic shift (CS) difference compared to a CS of sequence(s) used for the Uu-PSS among sequences having the same sequence polynomial as sequence(s) used for the Uu-PSS. Also, the S-SSS may generate sequence(s) using a CS value different from sequence(s) used for the Uu-SSS while using the same sequence polynomial as sequence(s) used for the Uu-SSS. In this case, an initial value used for generating S-SSS sequence(s) may be different from an initial value used for generating Uu-SSS sequence(s). Since the SSS can perform coherent detection after going through the initial synchronization process from the PSS, it is somewhat free from the frequency offset condition, and it is necessary to overcome only the residual offset remaining after the initial synchronization.

For example, the Uu-PSS used for the NR Uu link may use a 127-length m-sequence, and may use a total of three Uu-PSS sequences. Therefore, the CS values used to generate each m-sequence are 0, 43, and 86, which are integer multiples of 43, and the frequency offset without detection ambiguity is the difference between the CS values divided by 2, i.e. 21.5 subcarrier spacing (subcarrier spacing). In other words, for a frequency offset value lower than 21.5 subcarrier spacing, Uu-PSS detection may be possible without ambiguity.

The SL-SSID is ID1 and ID2, which are information indicated by the S-PSS and the S-SSS, and may be expressed as in Equation 1 below. As an embodiment, it is assumed that the S-PSS uses a total of 2 sequences, the S-SSS uses a total of 672 sequences, and the SL-SSID uses a total of 672 sequences.

$$ID_1 = \{0, \ldots, 335\}$$
$$ID_2 = \{0, 1\}$$
$$SLSSID = 336 * ID_2 + ID_1$$

[Equation 1]

In this case, an S-PSS may transmit ID2 information, and an S-SSS may transmit both ID1 information and ID2 information.

In an embodiment, an S-PSS sequence as in Equation 2 below may be used.

$$ID_2 = \{0, 1\}$$
$$d_{PSS}(n) = 1 - 2x(m)$$
$$m = (n + 43 \cdot ID_2 + 21) \bmod 127$$
$$0 \leq n < 127$$
$$x(i+7) = (x(i+4) + x(i)) \bmod 2$$
$$x(6:0) = [1\ 1\ 1\ 0\ 1\ 1\ 0]$$

[Equation 2]

m in Equation 2 may be replaced by m based on a CS value illustrated in Equation 3 below. Equation 3 is as follows.

[Equation 3]

1) $m = (n + 43 \cdot ID_2 + 22) \bmod 127 \rightarrow$ interval of different cyclic shift values 2) $m = (n + 21) \bmod 127$ for $ID_2 = 0 \rightarrow$ maximize interval between two cyclic shift $m = (n + 43 + 22) \bmod 127$ for $ID_2 = 1$ 3) $m = (n + 22) \bmod 127$ for $ID_2 = 0 \rightarrow$ maximize interval between two cyclic shift $m = (n + 43 + 21) \bmod 127$ for $ID_2 = 1$ 4) $m = (n + 43 \cdot ID_2 + 21) \bmod 127 \rightarrow$ position of the other two cyclic shift values 5) $m = (n + 43 \cdot ID_2 + 43 + 22) \bmod 127 \rightarrow$ interval of different cyclic shift values 6) $m = (n + 43 + 21) \bmod 127$ for $ID_2 = 0 \rightarrow$ maximize interval between two cyclic shift $m = (n + 86 + 22) \bmod 127$ for $ID_2 = 1$ 7) $m = (n + 43 + 22) \bmod 127$ for $ID_2 = 0 \rightarrow$ maximize interval between two cyclic shift $m = (n + 86 + 21) \bmod 127$ for $ID_2 = 1$ 8) $m = (n + 86 \cdot ID_2 + 21) \bmod 127 \rightarrow$ position of the other two cyclic shift values 9) $m = (n + 86 \cdot ID_2 + 22) \bmod 127 \rightarrow$ interval of different cyclic shift values 10) $m = (n + 21) \bmod 127$ for $ID_2 = 0 \rightarrow$ maximize interval between two cyclic shift $m = (n + 86 + 22) \bmod 127$ for $ID_2 = 1$ 11) $m = (n + 22) \bmod 127$ for $ID_2 = 0 \rightarrow$ maximize interval between two cyclic shift $m = (n + 86 + 21) \bmod 127$ for $ID_2 = 1$ If SL communication is performed in a completely different frequency band from Uu link-based communication, such as an ITS dedicated band, since there is no interference issue by a Uu PSS, a CS for an S-PSS may be set to any two values separated by 63 or 64 to withstand the maximum frequency offset value. Among the equations for generating a S-PSS based on the above method, examples of the m value to which a CS value is applied are shown in Equation 4 below.

[Equation 4]

12) $m = (n + 63 \cdot ID_2) \bmod 127 \rightarrow$ maximize interval between two cyclic shift 13) $m = (n + 64 \cdot ID_2) \bmod 127 \rightarrow$ interval of different cyclic shift values 14) $m = (n + 63) \bmod 127$ for $ID_2 = 0 \rightarrow$ position of the other two cyclic shift values $m = (n + 126) \bmod 127$ for $ID_2 = 1$ 15) $m = (n + 64) \bmod 127$ for $ID_2 = 0 \rightarrow$ interval of different cyclic shift values $m = (n + 126) \bmod 127$ for $ID_2 = 1$ An S-SSS sequence may use, for example, the same CS value as a Uu SSS sequence, in this case, a sequence may be generated based on Equation 5 below.

[Equation 5]

$d_{S-SSS}(n) = [1 - 2x_0((n + m_0) \bmod 127)] \cdot [1 - 2x_1((n + m_1) \bmod 127)]$ $m_0 = 10 \left\lfloor \dfrac{ID_i}{112} \right\rfloor + S \cdot ID_2$ $m_1 = ID_1 \bmod 112$ $0 \leq n < 127$ $x_0(i + 7) = (x_0(i + 4) + x_0(i)) \bmod 2$ $x_1(i + 7) = (x_1(i + 1) + x_1(i)) \bmod 2$ $[x_0(6) \ x_0(5) \ x_0(4) \ x_0(3) \ x_0(2) \ x_0(1) \ x_0(0)] = [0 \ 0 \ 0 \ 0 \ 0 \ 0 \ 1]$ $[x_1(6) \ x_1(5) \ x_1(4) \ x_1(3) \ x_1(2) \ x_1(1) \ x_1(0)] = [0 \ 0 \ 0 \ 0 \ 0 \ 0 \ 1]$ Uu-SSS uses a gold sequence consisting of XOR values of two m-sequences, the first m sequence among the two m-sequences may use the same sequence polynomial as the sequence for Uu-PSS, the second m sequence may use an independent m-sequence separate from the sequence related to the Uu-PSS. In this way, if the same sequence polynomial as the m-sequence used to generate the Uu-PSS is used for the first m-sequence, compared to the other case, the cross-correlation between Uu-PSS and Uu-SSS may be improved (or increased).

At this time, also an S-PSS that can be used as Uu link and TDD may use a sequence polynomial used to generate the same Uu-PSS and an m-sequence based on a CS value different from the CS value used by the Uu-PSS, rather than using an independent m-sequence. As in the case of the Uu-PSS, the CS value may be configured to have a maximum difference from the Uu-PSS while equally dividing the CS difference value between the Uu-PSS sequences.

In one embodiment, when the NR sidelink uses three S-PSS sequences, a CS value may be derived by adding an integer offset value close to 43/2 to an integer multiple of 43. Through this, it is possible to obtain a CS value having the largest difference between S-PSSs while using a CS value having the largest difference from a Uu-PSS. However, a frequency offset value that can be overcome while avoiding detection ambiguity with Uu-PSS during initial access is reduced by half compared to Uu-PSS, and the value may be about 21 or 22.

In another embodiment, when one-shot detection performance is required for S-PSS, a plurality of S-PSS sequences may be used, and in this case, the number of different CS values may increase in proportion to the number of required S-PSS sequences. In this case, when different CS values are used, the frequency offset value to be endured during the initial connection becomes very small, so that there is a problem in that detection performance is deteriorated. To solve these problems, a new independent CS value may be applied using an independent sequence different from the m-sequence used by an S-PSS or a Uu-PSS. The frequency offset value that can be overcome in this case can be set to the maximum possible value, but as a disadvantage, since a sequence different from the sequence polynomial used in a Uu-PSS is used, cross-correlation with a Uu-PSS, an S-PSS and a Uu-SSS and an S-SSS signals may be degraded.

In another embodiment, in order to overcome the above disadvantage, a method for generating a plurality of sequences used in an S-PSS using the sequence polynomial used in generation of a second m-sequence used in generation of a Gold sequence for a Uu-SSS or an S-SSS is proposed. In this case, an initial value used for generating the S-PSS sequence may use a value different from an initial value used for generating a Uu-SSS sequence.

In one embodiment, assuming that two S-PSS (symbols) are used, the first S-PSS may be generated using a same sequence polynomial used to generate a first m-sequence used in a Uu-PSS m-sequence or an S-SSS Gold sequence, a same initial value and a different CS. When an m-sequence of a second S-PSS is generated, a same sequence polynomial used to generate a second sequence used in an S-SSS Gold sequence, a same initial value and a different CS is used, so that a low cross-correlation between the S-PSS and the S-SSS can be maintained. In addition, since a second m-sequence of an S-PSS was generated based on a sequence polynomial already used in a Uu-SSS and an S-SSS, the detection performance for the overall synchronization signal may have the following advantages 1) to 3) compared to when a completely independent sequence is used.

1) Low cross-correlation between a Uu sync signal and an SL sync signal
2) Low cross-correlation between an S-PSS and an S-SSS
3) Obtain the maximum frequency offset value that can be overcome during initial access, which is upper bound by the number of S-PSSs regardless of the number of Uu-PSS sequences In another embodiment, a sequence of an S-PSS may be generated using a same sequence polynomial and initial values used to generate a second sequence of a Uu-SSS or an S-SSS, a CS different from a value used to generate a second sequence of an S-SSS, and two or more symbols may be used by repeating symbols of an S-PSS. By having this structure, an S-PSS uses a sequence independent of a Uu-PSS, resulting in lower cross-correlation, the cross-correlation between an S-PSS and an S-SSS is lowered by using the sequence used for an S-SSS, since an S-PSS sequence uses a sequence independent of a Uu-PSS sequence, an S-PSS robust to the maximum frequency offset can be generated regardless of the Uu-PSS sequence configuration.

At this time, about the number of symbols of S-PSS and S-SSS, the number of symbols or the number of repetitions may be determined to provide same signal reception coverage as the signal reception coverage provided by a Uu-PSS and a Uu-SSS, according to the difference between the maximum power reduction (MPR) value given according to the PAPR and cubic metric characteristics of the Uu-PSS and the Uu-SSS and the MPR value of an S-PSS and an S-SSS. For example, if Uu-PSS uses a Zadoff-chu sequence with low PAPR and repeatedly transmits it with two symbols, the number of S-PSS symbols generated using an m-sequence having a relatively high PAPR characteristic may be 3 or 4 symbols, or the same number of symbols may be repeated, in order to overcome this PAPR difference and provide the same reception coverage.

When the Peak-to-Average Power Ratio (PAPR) is large, linearity of a power amplifier (PA) with respect to a maximum power reduction (MPR) value for limiting a transmission strategy may be deteriorated. In order to maintain linearity, an MPR value of up to 2 dB may be applied according to a modulation method.

TABLE 5

| | channel bandwidth/transmission bandwidth ($N_{RB}$) | | | | | | |
|---|---|---|---|---|---|---|---|
| modulation | 1.4 MHz | 3.0 MHz | 5 MHz | 10 MHz | 15 MHz | 20 MHz | MPR(dB) |
| QPSK | >5 | >4 | >8 | >12 | >16 | >18 | =1 |
| 16QAM | =5 | =4 | =8 | =12 | =16 | =18 | =1 |
| 16QAM | >5 | >4 | >8 | >12 | >16 | >18 | =2 |

Table 5 shows examples of values of MPR for power class 1 and power class 3.

In one embodiment, if N L-length m-sequences are required for an S-PSS, after the m-sequence, with lengths greater than or equal to N*L values instead of L independent m-sequences, is generated, it can be divided into N L-length m-sequences and used to generate each S-PSS. At this time, when the receiving end performs the detection of the S-PSS, since the detection can be performed by concatenating N PSS sequences, detection performance may be improved by using a longer m-sequence characteristic compared to detection of a plurality of PSS sequences independent of each other.

At this time, an S-SSS, when M sequences are required, in order to improve the sequence detection performance while lowering the cross-correlation with an S-PSS, after generating an m-sequence of length M*L using the sequence polynomial used to generate an S-PSS m-sequence, and using a CS different from the S-PSS sequence, a Gold sequence may be generated by XORing the generated sequences. In this case, an initial value different from the initial value used for generating an S-PSS sequence may be used to generate an S-SSS sequence.

Hereinafter, some embodiments propose an S-SSB structure consisting of S-PSS symbol(s), S-SSS symbol(s) and PSBCH symbol(s).

Figure 14:
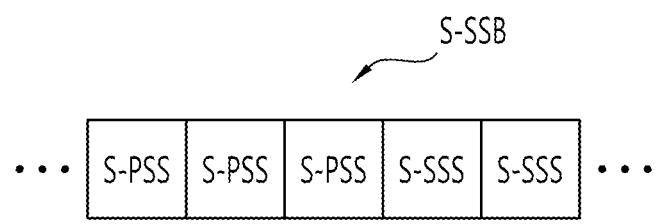
FIG. 14 shows a part of the structure of an S-SSB according to an embodiment of the present disclosure.

In the time domain before and after the S-PSS symbol, due to the MPR difference between an S-SSS symbol and a PSBCH symbol, a transition period for transmission amplifier operation of the terminal is required, it may be possible to use even a part of the received PSBCH symbol according to the UE capability, by filling this section with PSBCH symbols instead of dummy data. Alternatively, the same MPR can be applied to all sections of an S-SSB without a separate transition section, in this case, the number of S-PSS symbols may be increased in order to compensate for the reception performance of the S-PSS symbol, which can suffer relatively loss compared to the optimum transmission power in terms of transmission power. When two S-SSS symbols are used for an S-SSB and there is no transition period before and after S-PSS, for example, three S-PSS symbols may be used. In FIG. 14 below, some embodiments using three S-PSS symbols will be described.

FIG. 14 shows a part of the structure of an S-SSB according to an embodiment of the present disclosure.

In one embodiment, when using three S-PSS symbol(s) for S-SSB, a first S-PSS symbol may generate a sequence based on the same sequence polynomial, the same initial value, and a different CS (value) as the sequence for a Uu-PSS symbol. A second S-PSS symbol may generate a sequence based on the same sequence polynomial, the same initial value, and a different CS as the second m-sequence used to generate a Gold sequence of a Uu-SSS or an S-SSS. A third S-PSS symbol may use a complex conjugated symbol in the time domain for the first S-PSS symbol. In this way, by setting the three S-PSS symbols to different symbols based on different sequences, when detecting the S-PSS symbol from the viewpoint of a receiving terminal, it is possible to eliminate detection ambiguity and improve detection performance compared to the case of using the same symbol repeatedly. In addition, by generating a third S-PSS symbol in the form of a complex conjugate of a first S-PSS symbol, so that a receiving terminal detector can detect a first and a third S-PSS symbols using the same correlator, an increase in detector complexity may be minimized In the detection of the complex-conjugated third S-PSS symbol, in the correlation process calculated by a first S-PSS symbol detector, the correlation value can be calculated by using the multiplication value as it is and modifying only the addition and subtraction operations.

Meanwhile, some embodiments of two different sequences used for generating S-PSS symbols are as follows. Equation 6 below is a case in which the CS value of the m-sequence of the second S-PSS symbol is set to the maximum value of 63.

$$ID = 2 \cdot ID_1 + ID_2, \quad \text{[Equation 6]}$$
$$ID = \{0 \ldots 335\}, ID_1 = \{0 \ldots 167\}, ID_2 = \{0, 1\}$$
$$d_{PSS\_1}(n) = 1 - 2x(m)$$
$$m = (n + 43 \cdot ID_2 + 21) \bmod 127$$
$$0 \leq n < 127$$
$$x(i+7) = (x(i+4) + x(i)) \bmod 2$$
$$x(6:0) = [1\ 1\ 1\ 0\ 1\ 1\ 0]$$
$$d_{PSS\_2}(n) = 1 - 2x(m)$$
$$m = (n + 63 \cdot ID_2 + 63) \bmod 127$$
$$0 \leq n < 127$$
$$x(i+7) = (x(i+1) + x(i)) \bmod 2$$
$$x(6:0) = [0\ 0\ 0\ 0\ 0\ 0\ 1]$$

An example of an m-sequence having a CS interval of 64 and a minimum cubic metric of the m-sequence, so that it can transmit with maximum transmit power, with respect to a second S-PSS symbol is shown in Equation 7 below.

$$d_{PSS\_2}(n) = 1 - 2x(m) \quad \text{[Equation 7]}$$
$$m = (n + 64 \cdot ID_2 + 14) \bmod 127$$
$$0 \leq n < 127$$
$$x(i+7) = (x(i+1) + x(i)) \bmod 2$$
$$x(6:0) = [0\ 0\ 0\ 0\ 0\ 0\ 1]$$

In one embodiment, while the CS interval of the m-sequence for the second S-PSS symbol is 43, the same as the sequence for the NR Uu S-PSS symbol, an example of an m-sequence having a cubic metric of the minimum value so that it can be transmitted with the maximum transmit power is Equation 8 below.

$$d_{PSS\_2}(n) = 1 - 2x(m) \quad \text{[Equation 8]}$$
$$m = (n + 43 \cdot ID_2 + 77) \bmod 127$$
$$0 \leq n < 127$$
$$x(i+7) = (x(i+1) + x(i)) \bmod 2$$
$$x(6:0) = [0\ 0\ 0\ 0\ 0\ 0\ 1]$$

Meanwhile, in Equations 6 to 8, ID means the total number of SLSS IDs (or hypotheses) transmitted by an S-SSB, ID2 means the number of IDs (or hypotheses) transmitted by an S-PSS signal, ID1 means the number of IDs (or hypotheses) transmitted by an S-SSS signal. dPSS_1 means a sequence used for a first S-PSS symbol, and dPSS_2 means a sequence used for a second S-PSS symbol.

In one embodiment, a gold sequence for the S-SSS symbol is generated and used in the form of XOR of two m-sequences, In this case, the first m-sequence may be generated based on the same sequence polynomial, the same initial value, and a different CS as the first m-sequence used to generate a Uu-SSS gold sequence in order to lower the correlation with the Uu-SSS symbol. At this time, if the length of the entire region for the CS value (or interval) not used by the first m-sequence of the Uu-SSS gold sequence is M, and the CS value to be allocated is N, the CS value corresponding to the integer (k*M/(N+1)) position from the start position of the M-length region can be used by dividing the entire M-length region into (N+1) equal parts. In this case, the integer(x) function represents the nearest integer or maps the integer value corresponding to the real value x through rounding-up or rounding-down, the value of k is an integer in the range 1<=k<=N. Through this, the new CS value may have a value spaced apart by the same maximum interval between CS values while falling at the maximum interval from the CS value used by the first m-sequence of the existing Uu-SSS gold sequence. In particular, when a frequency offset exists, the spectrum rotates in the frequency domain in the form of CS, even in this case, the minimum and maximum values of the new CS may be spaced apart by the maximum interval from the CS value used by the first m-sequence of the Uu-SSS gold sequence in the CS frequency domain.

In V2X application, due to the Doppler effect between vehicles traveling in opposite directions at high speed on a highway and crossing each other, very large frequency offsets can occur. So unlike Uu links, even after a receiving terminal roughly compensates for the frequency offset through S-PSS, the residual frequency offset value may remain large, the proposed CS configuring method has the advantage of being robust to the maximum residual frequency offset value so that detection ambiguity between S-SSS sequences does not occur even in this case.

An embodiment of a gold sequence (dSSS in Equation 9 below) for an S-SSS symbol generated using two m-sequences is as follows. The sequence below is, like an SSS sequence of NR Uu, a case of using a value different from the CS used by an SSS sequence of NR Uu, and that CS values are separated by 5.

$$d_{sss}(n) = [1 - 2x_0((n + m_0) \bmod 127)] \cdot [1 - 2x_1((n + m_1) \bmod 127)] \qquad \text{[Equation 9]}$$

$$m_0 = 10\left\lfloor \frac{ID_1}{84} \right\rfloor + 5*ID_2 + 85$$

$$m_1 = ID_1 \bmod 84$$

$$0 \le n < 127$$

$$x_0(i + 7) = (x_0(i + 4) + x_0(i)) \bmod 2$$

$$x_1(i + 7) = (x_1(i + 1) + x_1(i)) \bmod 2$$

$$x_0(6:0) = [0\ 0\ 0\ 0\ 0\ 0\ 1]$$

$$x_1(6:0) = [0\ 0\ 0\ 0\ 0\ 0\ 1]$$

In one embodiment, an example of an SSS sequence with high tolerance to residual frequency offset remaining after compensating for a frequency offset through an S-PSS-based synchronization process while using a value different from the CS used by the SSS sequence of NR Uu is shown in Equation 10 below.

$$d_{sss}(n) = [1 - 2x_0((n + m_0) \bmod 127)] \cdot [1 - 2x_1((n + m_1) \bmod 127)] \qquad \text{[Equation 10]}$$

$$m_0 = 34\left\lfloor \frac{ID_1}{84} \right\rfloor + 17*ID_2 + 58$$

$$m_1 = ID_1 \bmod 84$$

$$0 \le n < 127$$

$$x_0((i + 7) = (x_0(i + 4) + x_0(i)) \bmod 2$$

$$x_1(i + 7) = (x_1(i + 1) + x_1(i)) \bmod 2$$

$$x_0(6:0) = [0\ 0\ 0\ 0\ 0\ 0\ 1]$$

$$x_1(6:0) = [0\ 0\ 0\ 0\ 0\ 0\ 1]$$

An example of an S-SSS sequence for a case where the total number of IDs is 672 and the number of ID1s is 368 is shown in Equation 11 below.

[Equation 11]

$$ID = 2 \cdot ID_1 + ID_2,$$

$$ID = \{0 \ldots 671\}, ID_1 = \{0 \ldots 335\}, ID_2 = \{0, 1\}$$

$$d_{SSS}(n) = [1 - 2x_0((n + m_0) \bmod 127)] \cdot [1 - 2x_1((n + m_1) \bmod 127)]$$

$$m_0 = 24\left\lfloor \frac{ID_1}{112} \right\rfloor + 12 * ID_2 + 54$$

$$m_1 = ID_1 \bmod 112$$

$$0 \leq n < 127$$

$$x_0(i + 7) = (x_0(i + 4) + x_0(i)) \bmod 2$$

$$x_1(i + 7) = (x_1(i + 1) + x_1(i)) \bmod 2$$

$$x_0(6:0) = [0\ 0\ 0\ 0\ 0\ 0\ 1]$$

$$x_1(6:0) = [0\ 0\ 0\ 0\ 0\ 0\ 1]$$

In an S-SSB structure, a PSBCH symbol may be used in both an AGC symbol period used for a start symbol of an S-SSB and a TX/RX switching GAP symbol period used for a last symbol of an S-SSB, a partial section of a received PSBCH symbol can be used for PSBCH decoding according to a UE capability. Examples of the S-SSB structure to which a transition period for at least one of AGC, MPC, and TX/RX switching is applied and related embodiments will be described below with reference to FIGS. 15 to 17.

Figure 15:
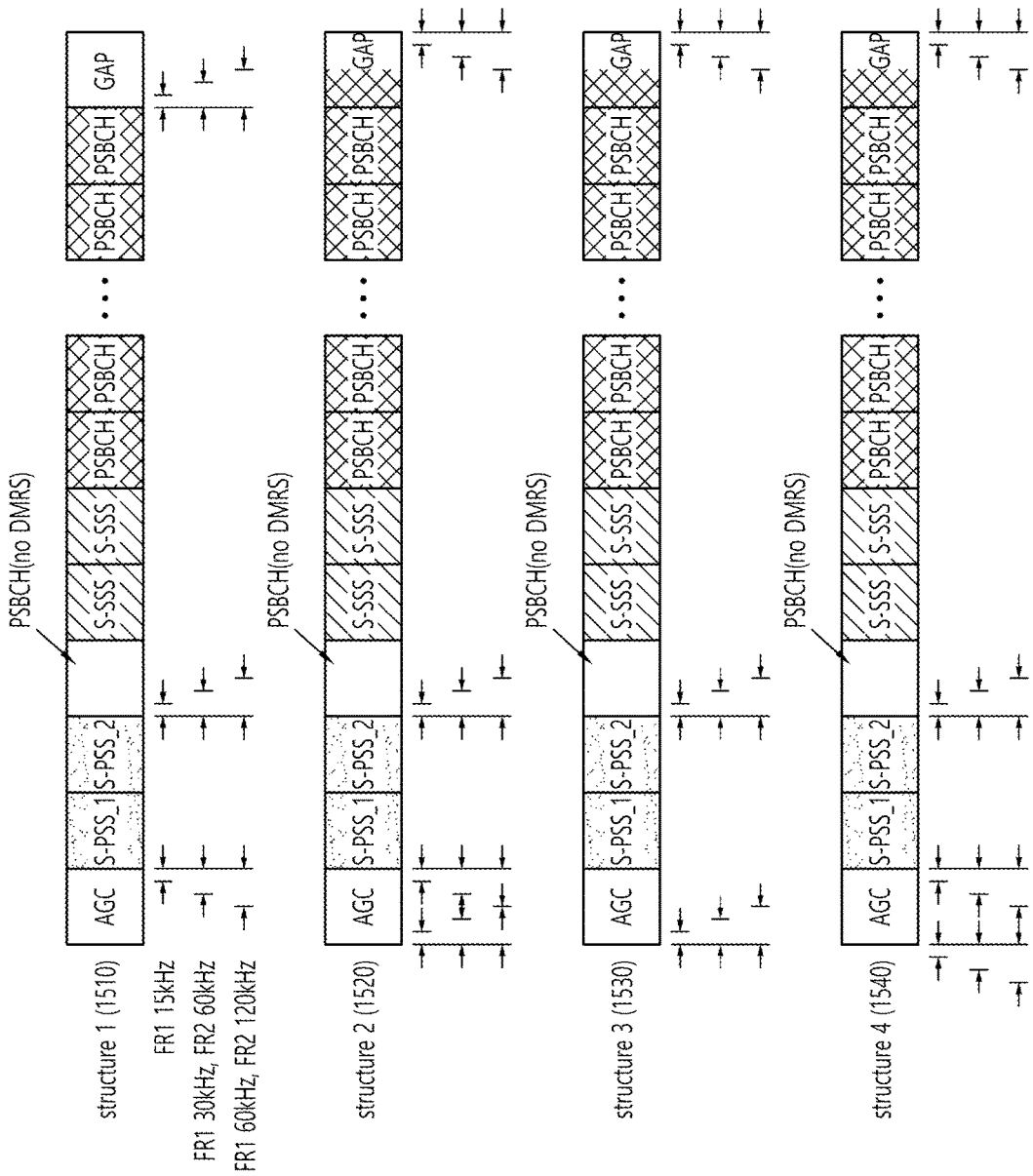
FIG. 15 shows examples of a structure of an S-SSB, according to an embodiment of the present disclosure.
Figure 16:
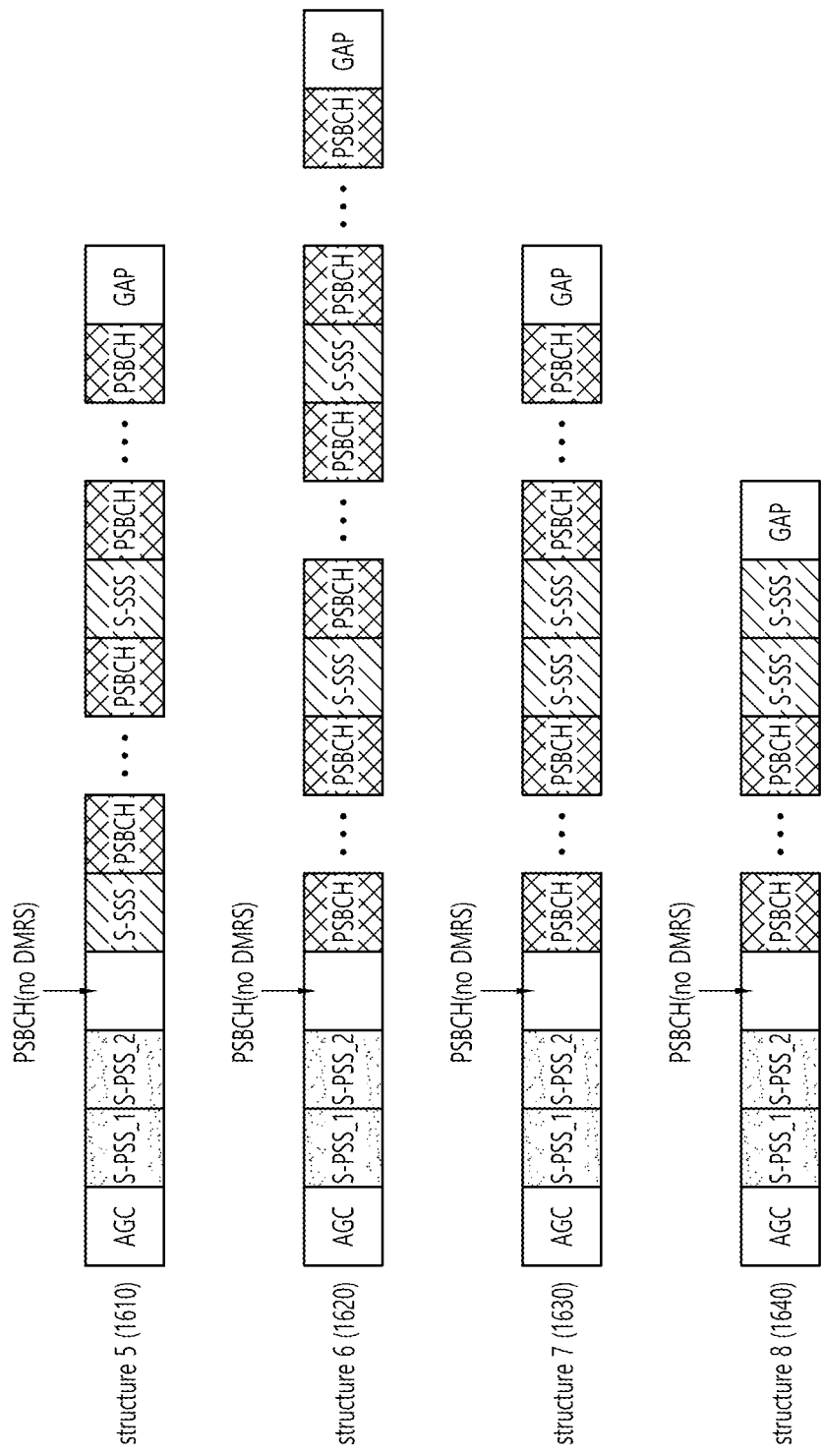
FIG. 16 shows examples of a structure of an S-SSB according to another embodiment of the present disclosure.
Figure 17:
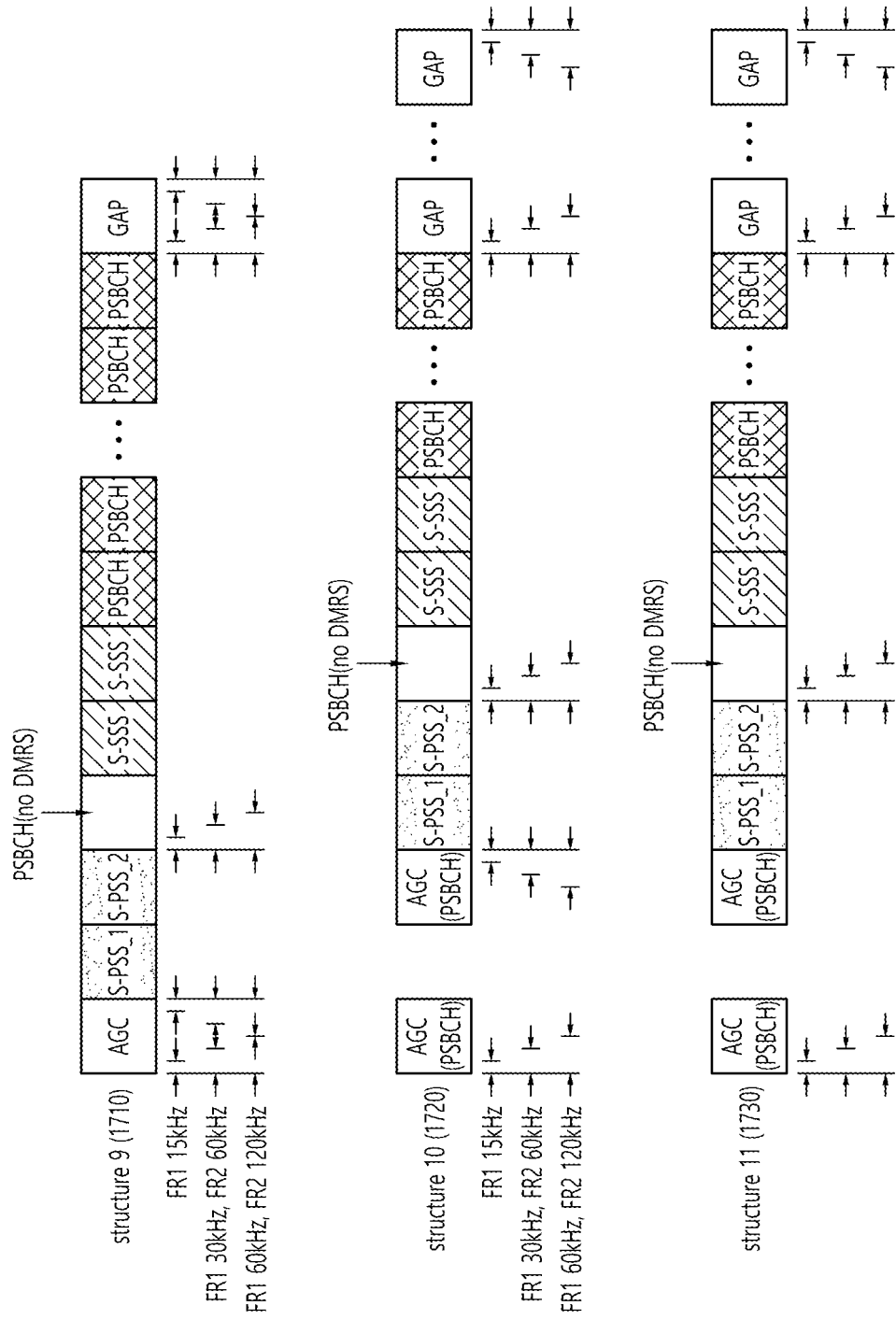
FIG. 17 shows examples of the structure of the S-SSB, according to another embodiment of the present disclosure.

In at least one embodiment of the embodiments related to FIGS. 15 to 17 to be described later, an AGC symbol and a GAP symbol may be used at the beginning and the end of an S-SSB, respectively, two symbols for each of S-PSS and S-SSS may exist. In addition, in the case of S-PSS, symbol detection ambiguity is removed by using different sequences for the first symbol and the second symbol. In addition, by locating a transition period in at least one of the preceding section or the rear section of the S-PSS symbol, the S-PSS symbol is not distorted in the time domain. A section indicated by an arrow in FIGS. 15 to 17 below is a transition section. The transition period required for one symbol length is indicated, according to which band is related to FR1 (6 GHz or less) or FR2 (6 GHz or more and 52.6 GHz or less) and subcarrier spacing (SCS) (15 kHz, 30 kHz, 60 kHz, 120 kHz). In one example, as shown in FIGS. 15 to 17, a combination of relative lengths of a total of three types (Combination 1, Combination 2, and Combination 3) may be possible.

Combination 1: FR1 15 kHz SCS

Combination 2: FR1 30 kHz or FR2 60 kHz (The ratio of the transition period to the symbol length is the same)

Combination 3: 1-R1 60 kHz or FR2 120 kHz (The ratio of the transition period to the symbol length is the same)

FIGS. 15 to 17 will be described below.

FIG. 15 shows examples of a structure of an S-SSB, according to an embodiment of the present disclosure.

In the structure 1 (1510), two S-PSS symbols (S-PSS_1 and S-PSS_2) are located adjacent to each other, and two S-SS symbols are located adjacent to each other. According to structure 1 (1510), two adjacent S-PSS symbols or two adjacent S-SSS symbols are located within a channel coherence time and can share a channel estimate, thereby improving symbol detection performance Structure 2 (1520) is a case in which a transition period located in front of an S-PSS and a transition period in which a period other than an S-SSB signal period among the start periods of the S-SSB signal are considered together are applied to the AGC symbol period. In addition, a transition period applied to a GAP symbol is positioned at the end of the GAP symbol to improve decoding performance of a PSBCH (symbol) that can be transmitted in the GAP symbol period. At this time, in consideration of the application of this transition period, in the GAP symbol, PSBCH (content) may be transmitted in a comb type in the frequency domain, the structure 2 (1520) on the FIG applies the comb-2 type so that the first half of the GAP symbol period can be transmitted as a valid PSBCH symbol. In this case, the length of the effective PSBCH symbol period to be applied to the GAP symbol period may be adaptively adjusted and applied according to the ratio occupied by the transition period within one symbol period as shown in FIG. 15. That is, in the case of FR1 15 kHz, since the ratio of the transition period is relatively small, more GAP symbol periods can be used for PSBCH symbol transmission.

In the structure 3 (1530), unlike the structure 2 (1520), only one transition period applied to an AGC symbol period is applied, and a transition period is located at the start period of the AGC symbol period. It appears that the transition period required for the start period of the S-SSB and the transition period necessary for the start period of the S-PSS are unified into one transition period, by allowing the MPR applied to the S-PSS symbol period to be applied to the remaining AGC symbol period to which the transition period is not applied.

Structure 4 (1540) is a case in which decoding performance of PSBCH symbols transmitted in the remaining AGC symbol periods is improved by locating a transition period necessary for the start period of the S-SSB outside the AGC symbol period.

The number of PSBCH symbols used in structures 1 (1510) to 4 (1540) may be predefined, may be known in advance through high layer signaling, or may be signaled through S-PSS symbol or S-SSS symbol.

FIG. 16 shows examples of a structure of an S-SSB according to another embodiment of the present disclosure.

In structure 5 (1610) to structure 8 (1640) of FIG. 16, for convenience, the position of transition sections are omitted, and all types of transition sections or some transition sections shown in structure 1 (1510) to structure 4 (1540) of FIG. 15 may be applied to structure 5 (1610) to structure 8 (1640).

Structure 5 (1610) is a case where PSBCH symbols are located between S-SSS symbols, the number of PSBCH symbols that can be positioned between two S-SSS symbols may be configured to one of 1 to L (here, L is a natural number). In this case, the number of PSBCH symbols may be predefined, may be known in advance through higher layer signaling, or may be signaled through S-PSS symbols. According to structure 5 (1610), in a case that the residual frequency offset value after compensating through S-PSS is small by locating two S-SSS symbols apart in the time domain, as a result, it is possible to increase the accuracy of frequency offset value estimation by lengthening the length of the time domain (that is, the length between S-SSS symbols) in which the amount of change in frequency offset can be measured.

Structure 6 (1620) is similar to structure 5 (1610), except that a PSBCH symbol is located in the section before the first S-SSS symbol, the number of PSBCH symbols may be configured to one of 1 to M (where M is a natural number). The number of PSBCH symbols may be predefined, may be known in advance through higher layer signaling, or may be signaled through S-PSS symbols. Compared to structure 5 (1610), structure 6 (1620) can obtain time diversity by allowing PSBCH to be received at a location out of the channel coherence time by distributing it in a wider time domain, as a result, the reception performance of the PSBCH can be improved.

Compared to structure 6 (1620), in structure 7 (1630), it is possible to increase the detection and/or decoding performance of S-SSS symbols by applying combining by adjoining S-SSS symbols so that two S-SSS symbols enter within the channel coherence time and use the same channel, etc. In this case, the number of PSBCH symbols transmitted after an S-PSS symbol may be predefined, may be known in advance through higher layer signaling, or may be signaled through an S-PSS symbol, the number of PSBCH symbols transmitted after an S-SSS symbol may be predefined, may be known in advance through higher layer signaling, or may be signaled through an S-PSS symbol or an S-SSS symbol.

Structure 8 (1640) is a structure in which an S-PSS symbol is positioned after an AGC symbol in an S-SSB, and an S-SSS symbol is positioned before a GAP symbol to maximize the interval between the S-PSS symbol and the S-SSS symbol. In structure 8 (1640), by adjoining two symbols of S-PSS and two symbols of S-SSS, the detection and/or decoding performance is increased, and at the same time, a time diversity gain can be obtained by the interval between S-PSS symbols and S-SSS symbols which is increased, and since the interval between the S-PSS symbol and the S-SSS symbol is large, rather than applying the channel estimated in the S-PSS symbol period to the S-SSS symbol period as it is, channel estimation independently in the S-SSS symbol period may be performed or channel estimated in the SSS symbol period may be additionally used. In this case, the number of PSBCH symbols may be predefined, may be known in advance through higher layer signaling, or may be signaled through an S-PSS symbol or an S-SSS symbol.

FIG. 17 shows examples of the structure of the S-SSB, according to another embodiment of the present disclosure.

Structure 9 (1710) shows a case in which a GAP symbol can be used for a transition period for another channel or another signal to be transmitted after the S-SSB. Referring to FIG. 17, a transition period indicated in the end period of the GAP symbol is a period for a signal to be transmitted after the S-SSB, it may be located in the GAP symbol period with the transition period indicated in the start period of the GAP symbol used for S-SSB. The application of a transition period within the GAP symbol period shown in structure 9 (1710) may be equally applied to structures 1 (1510) to structure 8 (1640) of FIGS. 15 and 16 described above.

Structure 10 (1720) shows a structure in which the number of AGC symbols and the number of GAP symbols are plural according to the subcarrier spacing (SCS) of the sidelink signal. Since the length of the SCS and the symbol is inversely proportional, when the length of an AGC section is determined, the number of AGC symbols and the number of GAP symbols may be determined in a relationship proportional to the SCS. In an embodiment, when the length of an AGC section of a terminal receiver is 34 us, the number of AGC symbols and GAP symbols may be respectively configured as follows according to the SCS. In this case, the number of AGC symbols and the number of GAP symbols may be determined independently or in conjunction with each other.

15 kHz SCS—one symbol
30 kHz SCS—one symbol
60 kHz SCS—two symbols
120 kHz SCS—four symbols In addition, in the case of an AGC symbol, it is used as a transition period or an AGC period, but it can help improve PSBCH decoding performance by transmitting PSBCH at the same time. At this time, a UE may use a section excluding the PSBCH symbol section used as the AGC section or the transition section for PSBCH decoding, or alternatively, PSBCH symbols distorted due to AGC and transition period may also be used for PSBCH decoding. The structure having a plurality of AGC symbols and GAP symbols shown in structure 10 (1720) may be equally applied to structure 1 (1510) to structure 9 (1710) described above.

Structure 11 (1730) shows a case in which the transmission power of the AGC symbol interval is equal to the transmission power of the S-PSS symbol interval, or the transmission power has only a difference allowed for applying the same MPR. The transition period indicated in the start period of the AGC symbol period is a transition period required to convert from the power-off state to the power-on state at the start point of the S-SSB, since the same MPR is applied to an AGC symbol and an S-PSS symbol, a separate transition period between an AGC symbol and an S-PSS symbol may not be required.

In this case, an AGC symbol may be composed of a PSBCH symbol in which peak values in the time domain can be clipped by a transmit power amplifier, or may be a signal composed only of demodulation reference signal (DMRS), or an S-PSS may be transmitted through the AGC symbol, or it may be composed of a random signal.

In a S-SSB structure shown in structure 1 (1510) to structure 11 (1730) described above, except for the AGC, transition period, and GAP period, the number of undistorted PSBCH symbols may be at least 4 or more, the entire S-SSB structure may fill one slot, may be transmitted through a part of one slot, or may be transmitted over several slots through aggregate of several slots, regardless of SCS.

The S-SSB structure may vary according to parameters (or numerology) used for sidelink communication. That is, the S-SSB structure may vary according to parameters such as SCS, CS length, FFT length, bandwidth, bandwidth portion, carrier frequency, slot format, CA (carrier aggregation), slot aggregation, etc., the corresponding parameter may be pre-configured or configured by a network and/or a base station.

Some of the above-described embodiments are related to a method of generating a sequence used when generating S-PSS and S-SSS that minimizes correlation with Uu link sync signal and maximizes sidelink sync signal detection performance. And, some of the above-described embodiments are related to the position of the transition period that can improve the reception performance of S-SSB when a time mask is applied due to the MPR difference between S-PSS, S-SSS, and PSBCH. And, some of the above-described embodiments are related to S-PSS symbol structure that improves reception performance of S-PSS while removing detection ambiguity when no time mask is applied. And, some of the above-described embodiments are related to S-SSB structure composed of AGC symbol, S-PSS symbol, S-SSS symbol, PSBCH symbol and GAP symbol, the proposed structure is to improve the reception performance for each symbol and to make the most of the AGC symbol interval and the GAP symbol interval.

Figure 18:
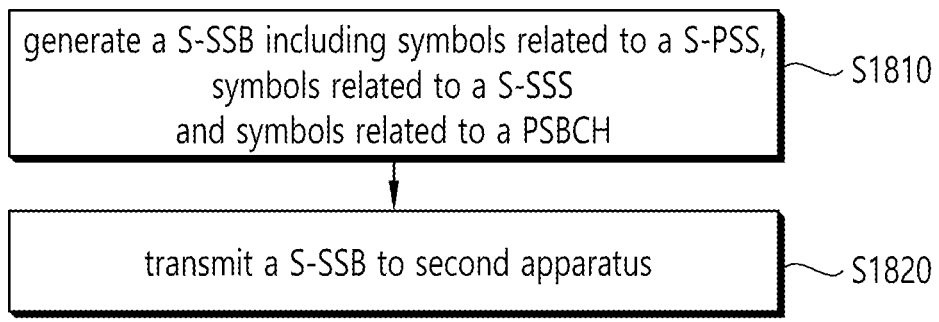
FIG. 18 shows operations of a first device, based on an embodiment of the present disclosure.

FIG. 18 is a flowchart showing an operation of a first device according to an embodiment of the present disclosure.

The operations disclosed in the flowchart of FIG. 18 may be performed in combination with various embodiments of the present disclosure. In one example, the operations disclosed in the flowchart of FIG. 18 may be performed based on at least one of the devices illustrated in FIGS. 20 to 25. In one example, the first device of FIG. 18 may correspond to the first wireless device 100 of FIG. 21 to be described later. In another example, a first device of FIG. 18 may correspond to a second wireless device 200 of FIG. 21, which will be described later.

In step S1810, a first apparatus according to an embodiment, may generate a sidelink synchronization signal block (S-SSB) including symbols related to a sidelink primary synchronization signal (S-PSS), symbols related to sidelink secondary synchronization signal (S-SSS) and symbols related to a physical sidelink broadcast channel (PSBCH).

In step S1820, the first apparatus according to an embodiment, may transmit the S-SSB to a second apparatus.

In one embodiment, wherein the total number of the S-PSS symbols is 3, and the S-PSS symbols include a first S-PSS symbol, a second S-PSS symbol and a third S-PSS symbol.

In one embodiment, wherein a first S-PSS sequence for the first S-PSS symbol may be generated based on the same sequence polynomial as a Uu-PSS sequence for a Uu-PSS symbol, the same initial value as the Uu-PSS sequence and a cyclic shift (CS) different from the Uu-PSS sequence. Additionally, a second S-PSS sequence for the second S-PSS symbol may be generated based on a sequence polynomial identical to a second m-sequence among a first m-sequence and the second m-sequence used to generate a gold sequence for a Uu-SSS symbol or an S-SSS symbol, a same initial value as the second m-sequence and a different CS from the second m-sequence. And, the third S-PSS symbol may be the first S-PSS symbol complex conjugated in the time domain.

In one embodiment, the first S-PSS sequence, the second S-PSS sequence and a third S-PSS sequence for the third S-PSS symbol may be different from each other.

In one embodiment, the total number of the S-SSS symbols may be 2.

In one embodiment, maximum power reduction (MPR) of one S-PSS symbol among the S-PSS symbols, MPR of one S-SSS symbol among the S-SSS symbols and MPR of one PSBCH symbol among the PSBCH symbols may be the same.

In one embodiment, among the S-PSS symbols, a preceding symbol adjacent to the first S-PSS symbol on time resources and a trailing symbol adjacent to the last S-PSS symbol on time resources among the plurality of S-PSS symbols may not be used as a transient period for amplifying.

In one embodiment, the following symbol adjacent to the last S-PSS symbol on time resources among the S-PSS symbols may be the first S-SSS symbol on time resources among the S-SSS symbols.

In one embodiment, among the S-PSS symbols, a preceding symbol adjacent to the first S-PSS symbol on time resources may be an automatic gain control (AGC) symbol.

In one embodiment, the AGC symbol may be the first symbol on the time resources of the S-SSB, the S-PSS symbols may include a second symbol, a third symbol and a fourth symbol on the time resources of the S-SSB, the first S-SSS symbol may be the fifth symbol on the time resources of the S-SSB.

In one embodiment, the first S-PSS symbol may be derived based on a first correlator that performs a multiplication operation based on a multiplier and performs a plurality of addition and subtraction operations, the third S-PSS symbol may be derived based on a second correlator that performs a multiplication operation based on the multiplier and performs a plurality of addition and subtraction operations.

In one embodiment, in some of the plurality of addition and subtraction operations performed by the first correlator, a subtraction operation may be replaced by an addition operation, or an addition operation may be replaced by a subtraction operation, in the process of deriving the third S-PSS symbol based on the second correlator.

According to an embodiment of the present disclosure, a first apparatus for performing SL communication may be proposed. the first apparatus may comprise: one or more memories storing instructions; one or more transceivers; and one or more processors connected to the one or more memories and the one or more transceivers, wherein the one or more transceivers: generate a sidelink synchronization signal block (S-SSB) including symbols related to a sidelink primary synchronization signal (S-PSS), symbols related to sidelink secondary synchronization signal (S-SSS) and symbols related to a physical sidelink broadcast channel (PSBCH), control the one or more transceivers to transmit the S-SSB to a second apparatus, wherein the total number of the S-PSS symbols is 3, and wherein the S-PSS symbols include a first S-PSS symbol, a second S-PSS symbol and a third S-PSS symbol.

According to an embodiment of the present disclosure, an apparatus (or chip(set)) configured to control a first user equipment (UE) may be proposed. The apparatus may comprise: one or more processors; and one or more memories operably connectable to the one or more processors and storing instructions, wherein the one or more processors execute the instructions to: generate a sidelink synchronization signal block (S-SSB) including symbols related to a sidelink primary synchronization signal (S-PSS), symbols related to sidelink secondary synchronization signal (S-SSS) and symbols related to a physical sidelink broadcast channel (PSBCH); and transmit the S-SSB to a second apparatus, wherein the total number of the S-PSS symbols is 3, and wherein the S-PSS symbols include a first S-PSS symbol, a second S-PSS symbol and a third S-PSS symbol.

In one example, the first terminal in the above embodiment may refer to the first device described in the first half of the present disclosure. In one example, the one or more processors, the one or more memories, etc. in the device for controlling the first terminal may be implemented as separate sub-chips, respectively, or at least two or more components may be implemented through one sub-chip.

According to an embodiment of the present disclosure, a non-transitory computer-readable storage medium storing instructions (or indications) may be proposed. The instructions, when executed, may cause a first apparatus to: generate a sidelink synchronization signal block (S-SSB) including symbols related to a sidelink primary synchronization signal (S-PSS), symbols related to sidelink secondary synchronization signal (S-SSS) and symbols related to a physical sidelink broadcast channel (PSBCH); and transmit the S-SSB to a second apparatus, wherein the total number of the S-PSS symbols may be 3, and wherein the S-PSS symbols may include a first S-PSS symbol, a second S-PSS symbol and a third S-PSS symbol.

FIG. 19 is a flowchart showing an operation of a second device according to an embodiment of the present disclosure.

The operations disclosed in the flowchart of FIG. 19 may be performed in combination with various embodiments of the present disclosure. In one example, the operations disclosed in the flowchart of FIG. 19 may be performed based on at least one of the devices illustrated in FIGS. 20 to 25. In one example, the second device of FIG. 19 may correspond to the second wireless device 200 of FIG. 21, which will be described later. In another example, the second device of FIG. 19 may correspond to the first wireless device 100 of FIG. 21 to be described later.

In step S1910, a second apparatus according to an embodiment, may receive, from a first apparatus, a sidelink synchronization signal block (S-SSB) including symbols related to a sidelink primary synchronization signal (S-PSS), symbols related to sidelink secondary synchronization signal (S-SSS) and symbols related to a physical sidelink broadcast channel (PSBCH).

In one embodiment, the total number of the S-PSS symbols may be 3, and the S-PSS symbols may include a first S-PSS symbol, a second S-PSS symbol and a third S-PSS symbol.

In one embodiment, a first S-PSS sequence for the first S-PSS symbol may be generated based on the same sequence polynomial as a Uu-PSS sequence for a Uu-PSS symbol, the same initial value as the Uu-PSS sequence and a cyclic shift (CS) different from the Uu-PSS sequence, a second S-PSS sequence for the second S-PSS symbol may be generated based on a sequence polynomial identical to a second m-sequence among a first m-sequence and the second m-sequence used to generate a gold sequence for a Uu-SSS symbol or an S-SSS symbol, a same initial value as the second m-sequence and a different CS from the second m-sequence, and the third S-PSS symbol may be the first S-PSS symbol complex conjugated in the time domain.

In one embodiment, the first S-PSS sequence, the second S-PSS sequence and a third S-PSS sequence for the third S-PSS symbol may be different from each other.

In one embodiment, the total number of the S-SSS symbols may be 2.

In one embodiment, maximum power reduction (MPR) of one S-PSS symbol among the S-PSS symbols, MPR of one S-SSS symbol among the S-SSS symbols and MPR of one PSBCH symbol among the PSBCH symbols may be the same.

In one embodiment, among the S-PSS symbols, a preceding symbol adjacent to the first S-PSS symbol on time resources and a trailing symbol adjacent to the last S-PSS symbol on time resources among the plurality of S-PSS symbols may not be used as a transient period for amplifying.

In one embodiment, the following symbol adjacent to the last S-PSS symbol on time resources among the S-PSS symbols may be the first S-SSS symbol on time resources among the S-SSS symbols.

In one embodiment, among the S-PSS symbols, a preceding symbol adjacent to the first S-PSS symbol on time resources may be an automatic gain control (AGC) symbol.

In one embodiment, the AGC symbol may be the first symbol on the time resources of the S-SSB, the S-PSS symbols may include a second symbol, a third symbol and a fourth symbol on the time resources of the S-SSB, the first S-SSS symbol may be the fifth symbol on the time resources of the S-SSB.

In one embodiment, the first S-PSS symbol may be derived based on a first correlator that performs a multiplication operation based on a multiplier and performs a plurality of addition and subtraction operations, the third S-PSS symbol may be derived based on a second correlator that performs a multiplication operation based on the multiplier and performs a plurality of addition and subtraction operations.

In one embodiment, in some of the plurality of addition and subtraction operations performed by the first correlator, a subtraction operation may be replaced by an addition operation, or an addition operation may be replaced by a subtraction operation, in the process of deriving the third S-PSS symbol based on the second correlator.

According to an embodiment of the present disclosure, a second apparatus for performing sidelink (SL) communication may be proposed. The second apparatus may comprise: one or more memories storing instructions; one or more transceivers; and one or more processors connected to the one or more memories and the one or more transceivers, wherein the one or more transceivers: control the one or more transceivers to receive, from a first apparatus, a sidelink synchronization signal block (S-SSB) including symbols related to a sidelink primary synchronization signal (S-PSS), symbols related to sidelink secondary synchronization signal (S-SSS) and symbols related to a physical sidelink broadcast channel (PSBCH), wherein the total number of the S-PSS symbols is 3, and wherein the S-PSS symbols include a first S-PSS symbol, a second S-PSS symbol and a third S-PSS symbol.

Various embodiments of the present disclosure may be implemented independently. Alternatively, various embodiments of the present disclosure may be implemented in combination with or merged with each other. For example, various embodiments of the present disclosure have been described based on a 3GPP system for convenience of description, but various embodiments of the present disclosure may be extendable to systems other than the 3GPP system. For example, various embodiments of the present disclosure are not limited to direct communication between terminals, and may be used in uplink or downlink, In this case, a base station or a relay node may use the method proposed according to various embodiments of the present disclosure. For example, a base station may be defined to inform a terminal, or a transmitting terminal may defined to inform a receiving terminal, information on whether the method according to various embodiments of the present disclosure is applied through a predefined signal (e.g., a physical layer signal or a higher layer signal). For example, a base station may be defined to inform a terminal, or a transmitting terminal may defined to inform information on rules according to various embodiments of the present disclosure through a predefined signal (e.g., a physical layer signal or a higher layer signal). For example, among various embodiments of the present disclosure, some embodiments may be limitedly applied only to resource allocation mode 1. For example, among various embodiments of the present disclosure, some embodiments may be limitedly applied only to resource allocation mode 2.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 20:
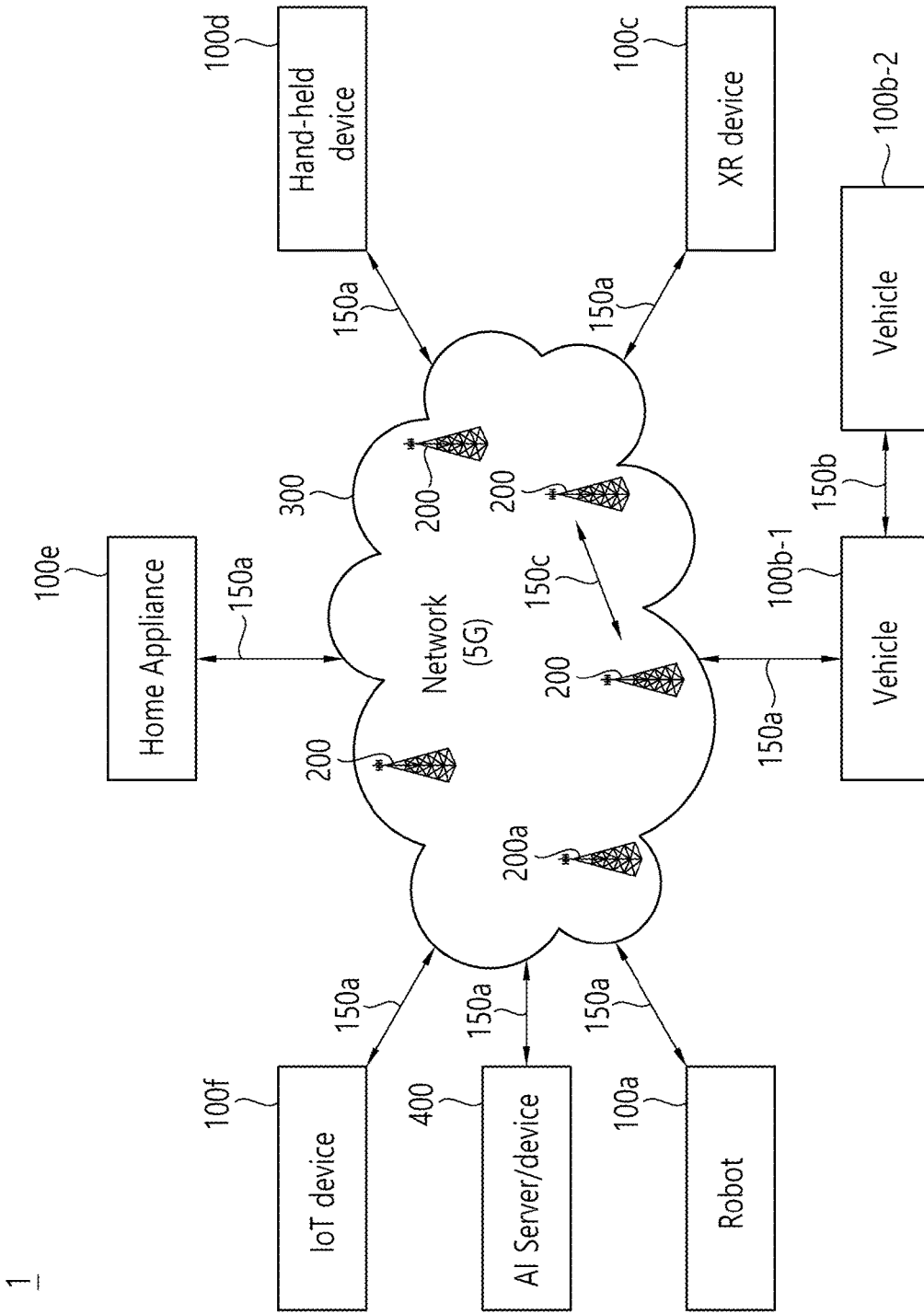
FIG. 20 shows a communication system 1, based on an embodiment of the present disclosure.

FIG. 20 shows a communication system 1, based on an embodiment of the present disclosure.

Referring to FIG. 20, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 21:
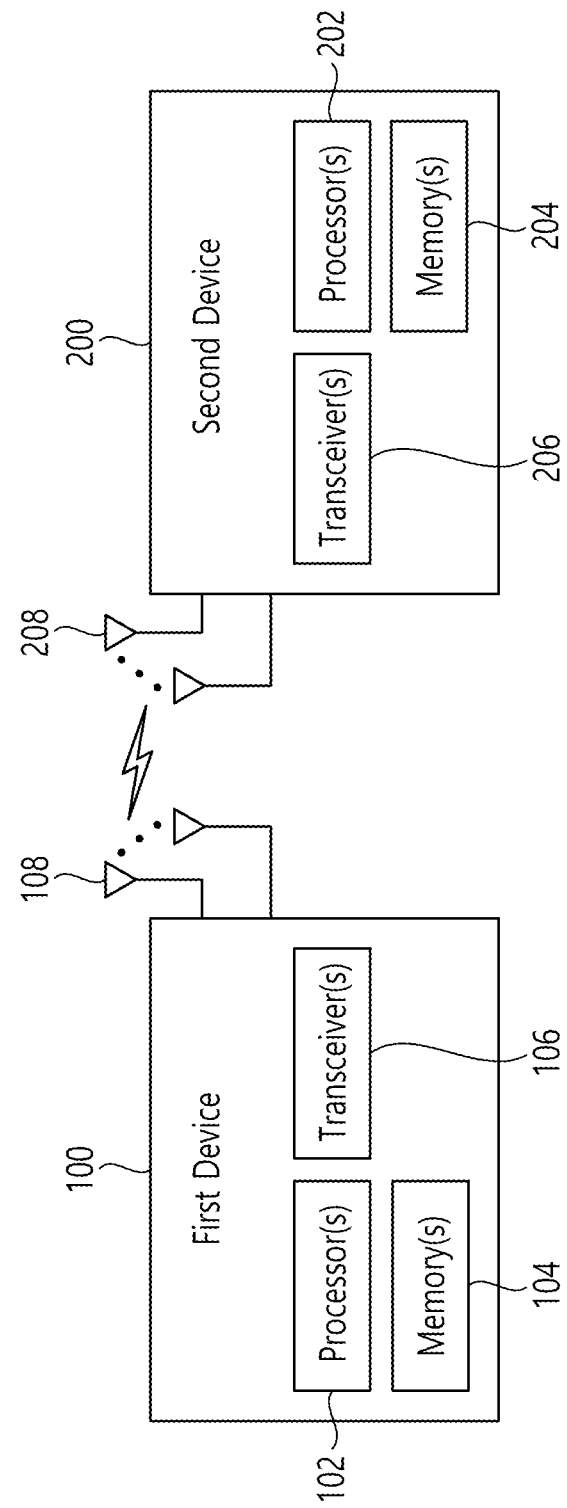
FIG. 21 shows wireless devices, based on an embodiment of the present disclosure.

FIG. 21 shows wireless devices, based on an embodiment of the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 22:
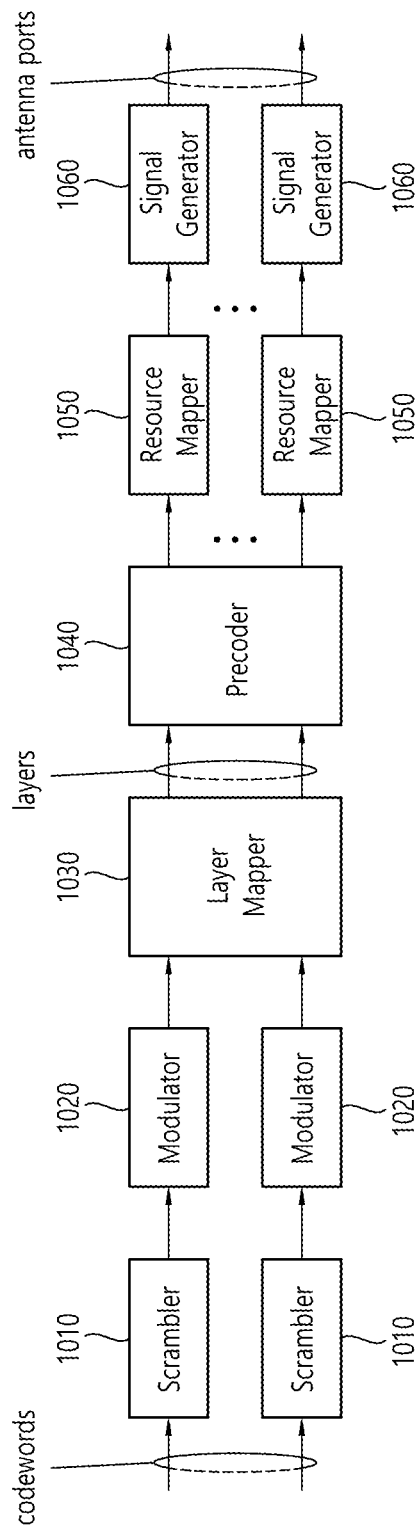
FIG. 22 shows a signal process circuit for a transmission signal, based on an embodiment of the present disclosure.

FIG. 22 shows a signal process circuit for a transmission signal, based on an embodiment of the present disclosure.

Referring to FIG. 22, a signal processing circuit 1000 may include scramblers 1010, modulators 1020, a layer mapper 1030, a precoder 1040, resource mappers 1050, and signal generators 1060. An operation/function of FIG. 22 may be performed, without being limited to, the processors 102 and 202 and/or the transceivers 106 and 206 of FIG. 21. Hardware elements of FIG. 22 may be implemented by the processors 102 and 202 and/or the transceivers 106 and 206 of FIG. 21. For example, blocks 1010 to 1060 may be implemented by the processors 102 and 202 of FIG. 21. Alternatively, the blocks 1010 to 1050 may be implemented by the processors 102 and 202 of FIG. 21 and the block 1060 may be implemented by the transceivers 106 and 206 of FIG. 21.

Codewords may be converted into radio signals via the signal processing circuit 1000 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 22. For example, the wireless devices (e.g., 100 and 200 of FIG. 21) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 23:
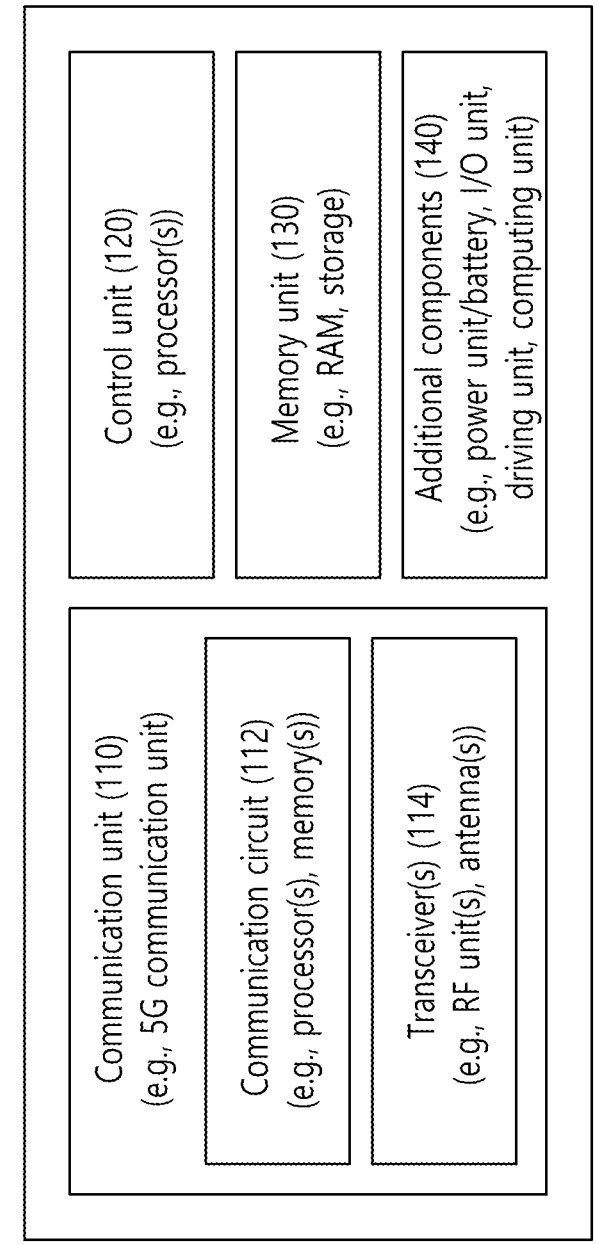
FIG. 23 shows another example of a wireless device, based on an embodiment of the present disclosure.

FIG. 23 shows another example of a wireless device, based on an embodiment of the present disclosure. The wireless device may be implemented in various forms according to a use-case/service (refer to FIG. 20).

Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Figure 24:
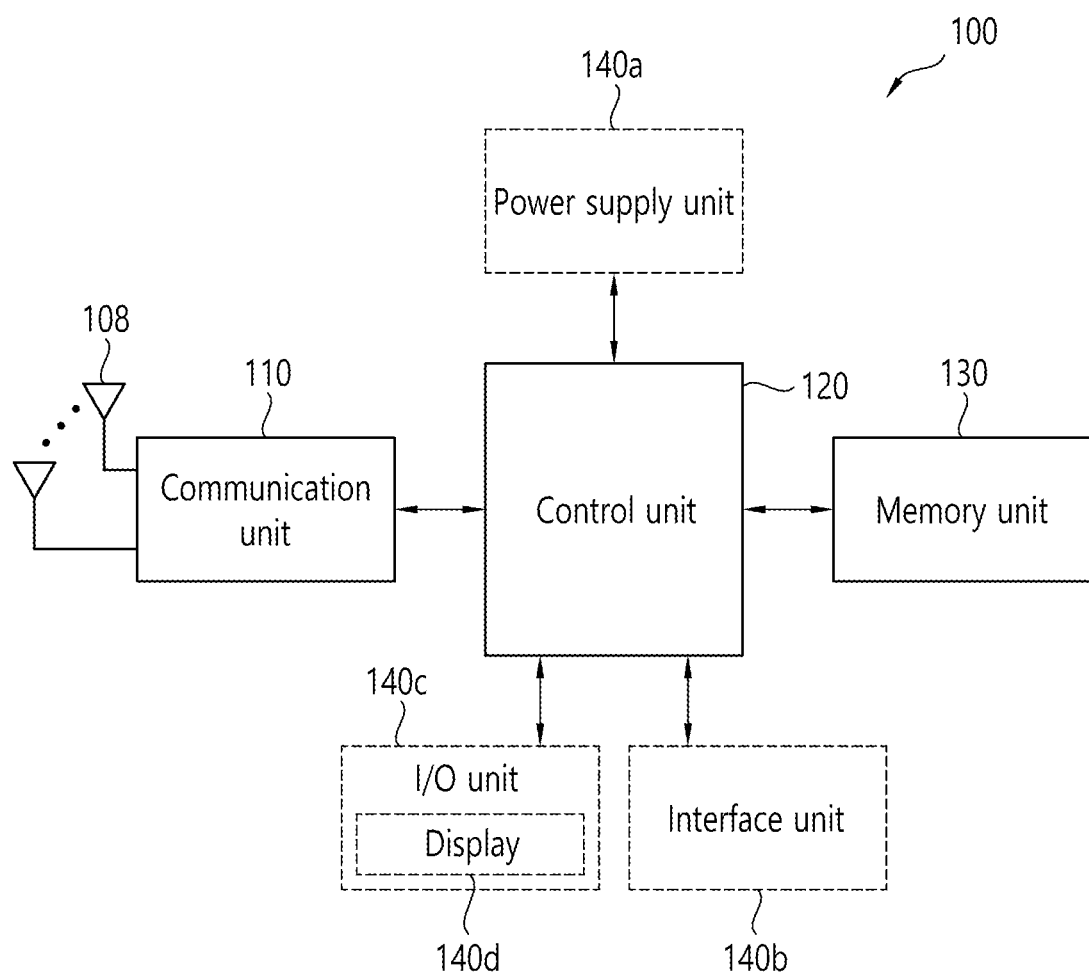
FIG. 24 shows a hand-held device, based on an embodiment of the present disclosure.

FIG. 24 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 25:
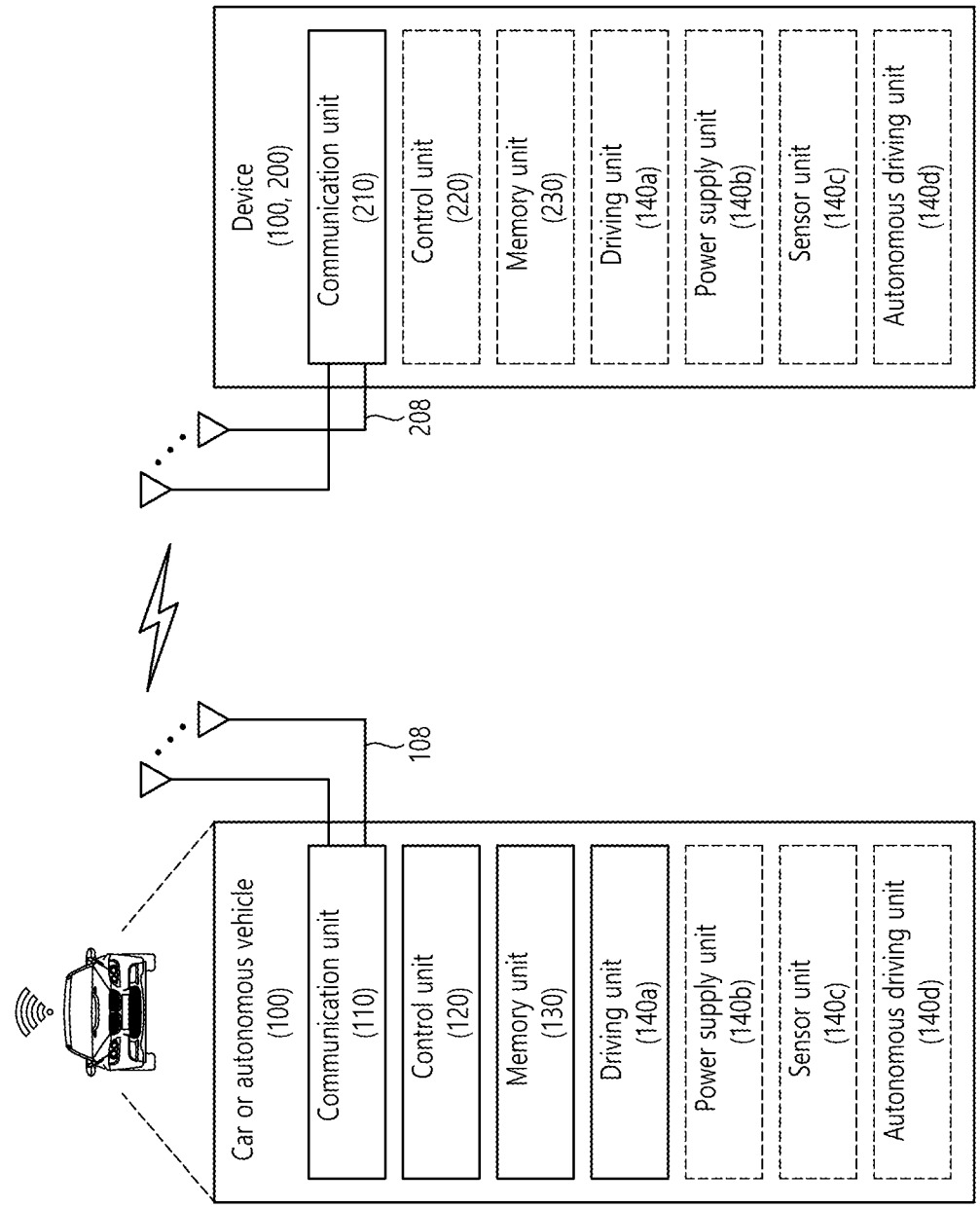
FIG. 25 shows a vehicle or an autonomous vehicle, based on an embodiment of the present disclosure.

FIG. 25 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 25, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The scope of the disclosure may be represented by the following claims, and it should be construed that all changes or modifications derived from the meaning and scope of the claims and their equivalents may be included in the scope of the disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first apparatus, sidelink (SL) communication, the method comprising:
   generating a sidelink synchronization signal block (S-SSB) including symbols related to a sidelink primary synchronization signal (S-PSS), symbols related to sidelink secondary synchronization signal (S-SSS) and symbols related to a physical sidelink broadcast channel (PSBCH);
   transmitting the S-SSB to a second apparatus;
   obtaining synchronization based on the S-SSB;
   transmitting, to a second apparatus, sidelink control information (SCI) for scheduling a physical sidelink shared channel (PSSCH) through a physical sidelink control channel (PSCCH); and
   transmitting, to the second apparatus, the PSSCH,
   wherein the total number of the S-PSS symbols is 3,
   wherein the S-PSS symbols include a first S-PSS symbol, a second S-PSS symbol and a third S-PSS symbol,
   wherein a first S-PSS sequence for the first S-PSS symbol is generated based on the same sequence polynomial as a Uu-PSS sequence for a Uu-PSS symbol, the same initial value as the Uu-PSS sequence and a cyclic shift (CS) different from the Uu-PSS sequence,
   wherein a second S-PSS sequence for the second S-PSS symbol is generated based on a sequence polynomial identical to a second m-sequence among a first m-sequence and the second m-sequence used to generate a gold sequence for a Uu-SSS symbol or an S-SSS symbol, a same initial value as the second m-sequence and a different CS from the second m-sequence, and
   wherein the third S-PSS symbol is the first S-PSS symbol complex conjugated in the time domain.

2. The method of claim 1, wherein the first S-PSS sequence, the second S-PSS sequence and a third S-PSS sequence for the third S-PSS symbol are different from each other.

3. The method of claim 1, wherein the total number of the S-SSS symbols is 2.

4. The method of claim 1, wherein maximum power reduction (MPR) of one S-PSS symbol among the S-PSS symbols, MPR of one S-SSS symbol among the S-SSS symbols and MPR of one PSBCH symbol among the PSBCH symbols are the same.

5. The method of claim 4, wherein the following symbol adjacent to the last S-PSS symbol on time resources among the S-PSS symbols is the first S-SSS symbol on time resources among the S-SSS symbols.

6. The method of claim 5, wherein among the S-PSS symbols, a preceding symbol adjacent to the first S-PSS symbol on time resources is an automatic gain control (AGC) symbol.

7. The method of claim 6, wherein the AGC symbol is the first symbol on the time resources of the S-SSB, the S-PSS symbols include a second symbol, a third symbol and a fourth symbol on the time resources of the S-SSB, the first S-SSS symbol is the fifth symbol on the time resources of the S-SSB.

8. The method of claim 1, wherein the first S-PSS symbol is derived based on a first correlator that performs a multiplication operation based on a multiplier and performs a plurality of addition and subtraction operations,
   wherein the third S-PSS symbol is derived based on a second correlator that performs a multiplication operation based on the multiplier and performs a plurality of addition and subtraction operations.

9. The method of claim 8, wherein in some of the plurality of addition and subtraction operations performed by the first correlator, a subtraction operation is replaced by an addition operation, or an addition operation is replaced by a subtraction operation, in the process of deriving the third S-PSS symbol based on the second correlator.

10. A first apparatus for performing sidelink (SL) communication, the first apparatus comprising:
    one or more memories storing instructions;
    one or more transceivers; and
    one or more processors connected to the one or more memories and the one or more transceivers, wherein the one or more processors:
    generate a sidelink synchronization signal block (S-SSB) including symbols related to a sidelink primary synchronization signal (S-PSS), symbols related to sidelink secondary synchronization signal (S-SSS) and symbols related to a physical sidelink broadcast channel (PSBCH);
    control the one or more transceivers to transmit the S-SSB to a second apparatus;
    obtain synchronization based on the S-SSB;
    control the one or more transceivers to transmit, to a second apparatus, sidelink control information (SCI) for scheduling a physical sidelink shared channel (PSSCH) through a physical sidelink control channel (PSCCH); and
    control the one or more transceivers to transmit, to the second apparatus, the PSSCH,
    wherein the total number of the S-PSS symbols is 3,
    wherein the S-PSS symbols include a first S-PSS symbol, a second S-PSS symbol and a third S-PSS symbol,
    wherein a first S-PSS sequence for the first S-PSS symbol is generated based on the same sequence polynomial as a Uu-PSS sequence for a Uu-PSS symbol, the same initial value as the Uu-PSS sequence and a cyclic shift (CS) different from the Uu-PSS sequence,
    wherein a second S-PSS sequence for the second S-PSS symbol is generated based on a sequence polynomial identical to a second m-sequence among a first m-sequence and the second m-sequence used to generate a gold sequence for a Uu-SSS symbol or an S-SSS symbol, a same initial value as the second m-sequence and a different CS from the second m-sequence, and
    wherein the third S-PSS symbol is the first S-PSS symbol complex conjugated in the time domain.

11. The first apparatus of claim 10, wherein the first S-PSS sequence, the second S-PSS sequence and a third S-PSS sequence for the third S-PSS symbol are different from each other.

12. An apparatus configured to control a first user equipment (UE), the apparatus comprising:
- one or more processors; and
- one or more memories operably connectable to the one or more processors and storing instructions, wherein the one or more processors execute the instructions to:
- generate a sidelink synchronization signal block (S-SSB) including symbols related to a sidelink primary synchronization signal (S-PSS), symbols related to sidelink secondary synchronization signal (S-SSS) and symbols related to a physical sidelink broadcast channel (PSBCH);
- transmit the S-SSB to a second apparatus;
- obtain synchronization based on the S-SSB;
- transmit, to a second apparatus, sidelink control information (SCI) for scheduling a physical sidelink shared channel (PSSCH) through a physical sidelink control channel (PSCCH); and
- transmit, to the second apparatus, the PSSCH, wherein the total number of the S-PSS symbols is 3, wherein the S-PSS symbols include a first S-PSS symbol, a second S-PSS symbol and a third S-PSS symbol, wherein a first S-PSS sequence for the first S-PSS symbol is generated based on the same sequence polynomial as a Uu-PSS sequence for a Uu-PSS symbol, the same initial value as the Uu-PSS sequence and a cyclic shift (CS) different from the Uu-PSS sequence, wherein a second S-PSS sequence for the second S-PSS symbol is generated based on a sequence polynomial identical to a second m-sequence among a first m-sequence and the second m-sequence used to generate a gold sequence for a Uu-SSS symbol or an S-SSS symbol, a same initial value as the second m-sequence and a different CS from the second m-sequence, and wherein the third S-PSS symbol is the first S-PSS symbol complex conjugated in the time domain.

* * * * *